United States Patent [19]
Littlefield

[11] 3,930,680
[45] Jan. 6, 1976

[54] MODULAR STRUCTURES FOR ENCLOSING A VEHICLE LOAD OR PASSENGER RECEIVING SPACE

[76] Inventor: Roger L. Littlefield, Rte. No. 2, Box 47A, Purcellville, Va. 22132

[22] Filed: July 13, 1973

[21] Appl. No.: 378,965

Related U.S. Application Data

[63] Continuation of Ser. No. 221,297, Jan. 27, 1973, which is a continuation of Ser. No. 867,233, Oct. 17, 1969, abandoned.

[52] U.S. Cl. ................................. 296/10; 296/36
[51] Int. Cl.² ........................................ B60P 3/32
[58] Field of Search ...... 296/10, 33, 36, 24, 23 MC, 296/35, 27, 35.1

[56] References Cited
UNITED STATES PATENTS

| | | | |
|---|---|---|---|
| 807,360 | 12/1905 | Coyle | 296/33 |
| 1,025,601 | 5/1912 | Wiggins | 296/33 |
| 2,324,508 | 7/1943 | Johnson | 296/36 |
| 2,324,508 | 7/1943 | Johnson | 296/36 |
| 3,155,419 | 11/1964 | Garson et al. | 296/10 X |
| 3,155,419 | 11/1964 | Garson | 296/10 X |
| 3,163,462 | 12/1964 | Valesky | 296/10 X |
| 3,205,002 | 9/1965 | Seng | 296/10 X |
| 3,574,391 | 4/1971 | Doboze | 296/36 |

Primary Examiner—Stanley H. Tollberg
Assistant Examiner—Norman L. Stack, Jr.
Attorney, Agent, or Firm—Strauch, Nolan, Neale, Nies & Kurz

[57] ABSTRACT

A knockdown modular enclosure structure that is adapted to convert vehicles for use either as mobile security or detention carriers for transporting prisoners, animals or the like or as a means of transportation in which the passengers are protected from persons outside the vehicle. In one embodiment the passenger or load space on the bed of a truck is enclosed by a series of knockdown panels defining the walls and roof of the enclosure. The panels are separably and detachably interlocked without the use of fasteners and in such a manner that they cannot be removed from either inside or outside the enclosure when at least one of the panels, which provide a doorway for entering and leaving the enclosed space is closed. The driver's compartment is protectively enclosed by an additional array of panels fitting over the windshield and windows or window spaces of the compartment. In vehicles having a roofless driver's compartment, a panel construction is provided for enclosing the top of the compartment as well.

28 Claims, 16 Drawing Figures

INVENTOR
ROGER L. LITTLEFIELD

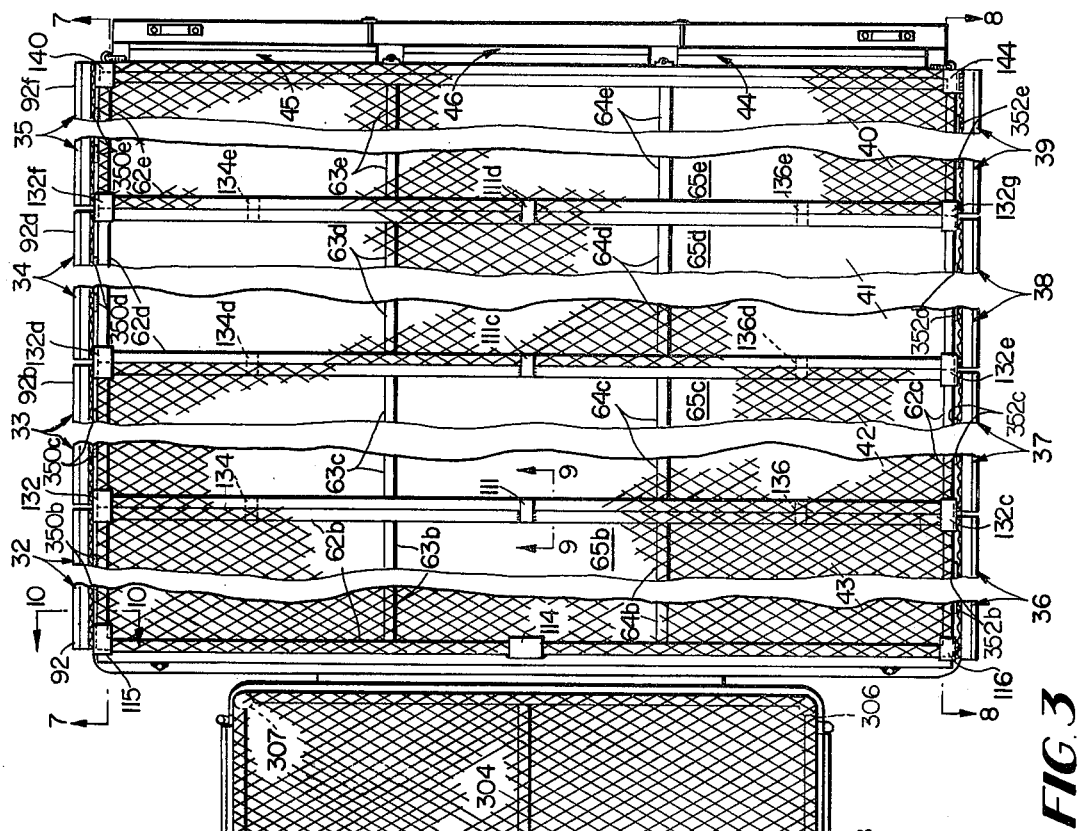
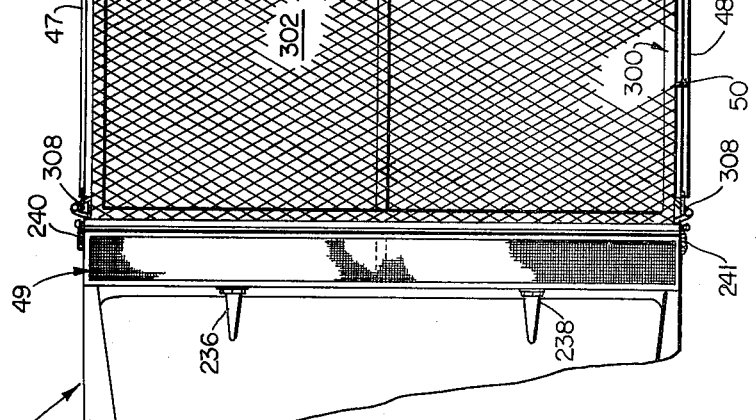
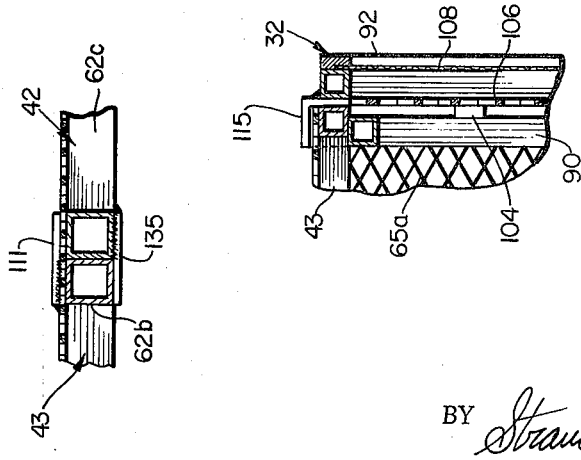

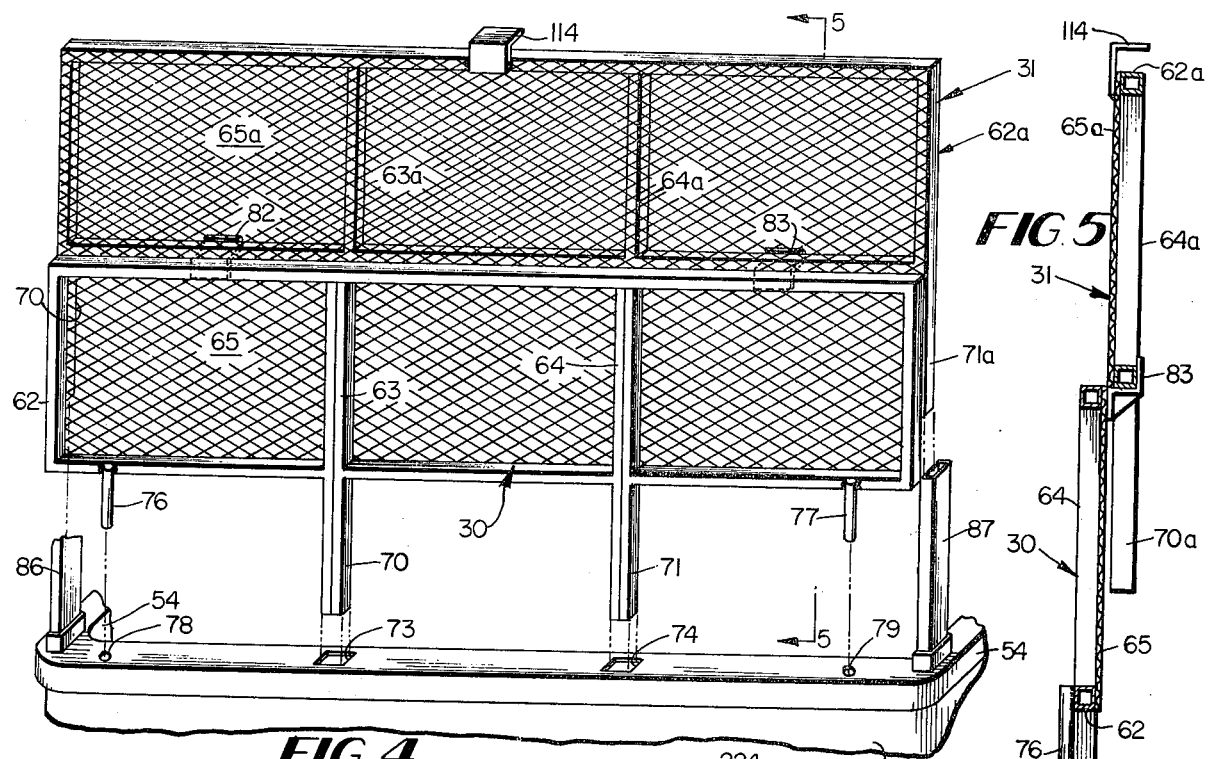
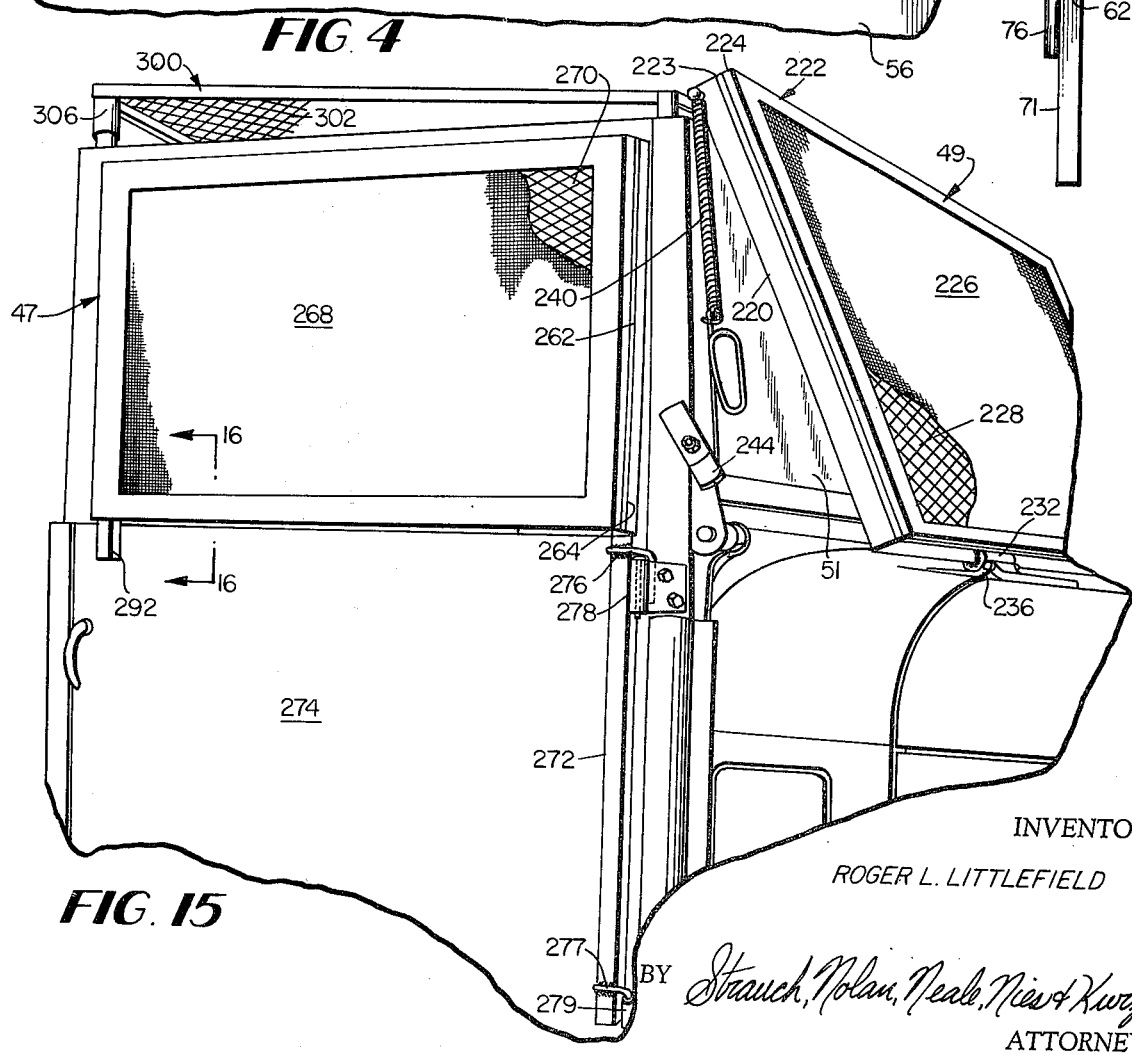

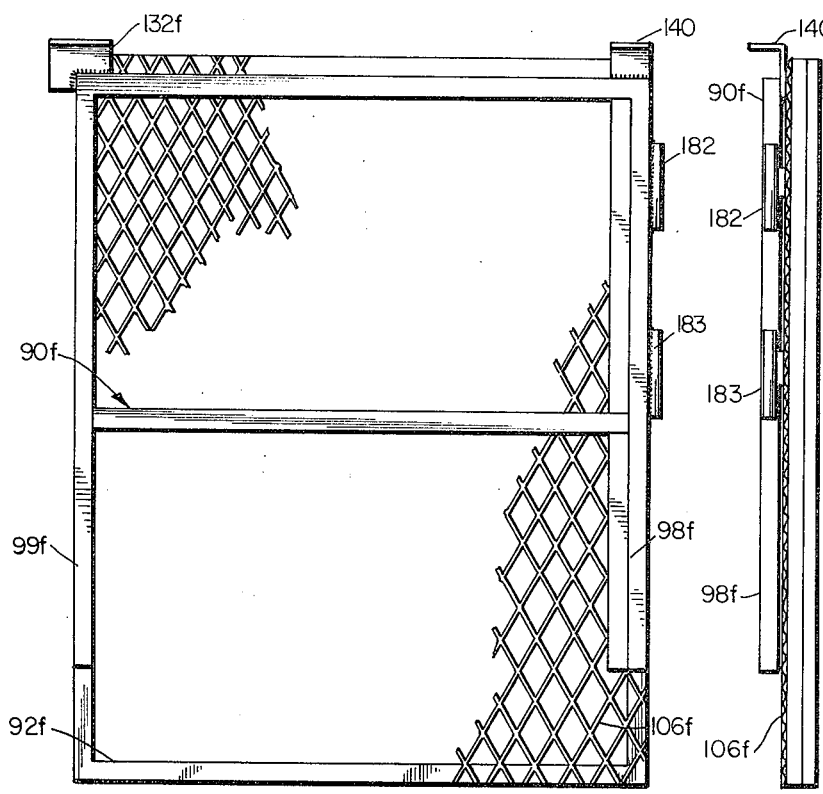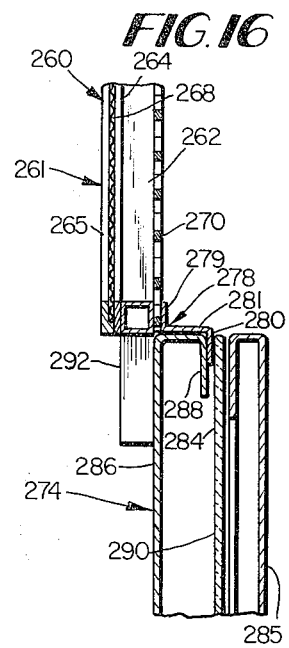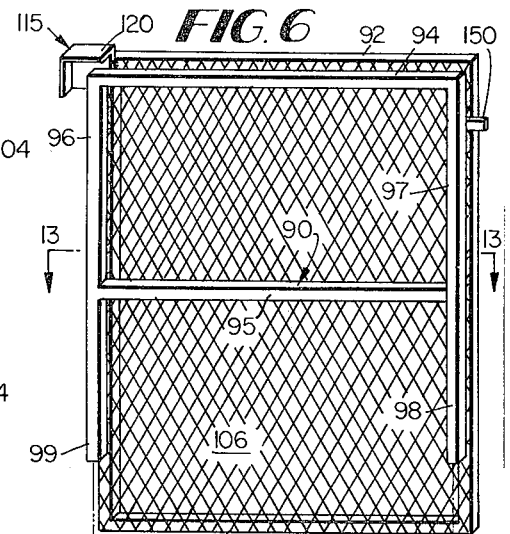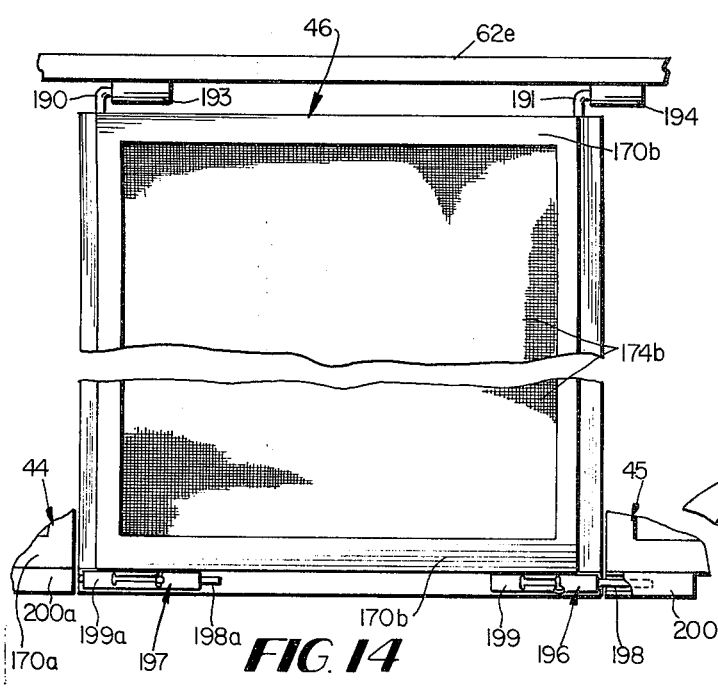

INVENTOR
ROGER L. LITTLEFIELD

MODULAR STRUCTURES FOR ENCLOSING A VEHICLE LOAD OR PASSENGER RECEIVING SPACE

This is a continuation of application Ser. No. 221,297, filed Jan. 27, 1973, which in turn is a continuation of now abandoned application Ser. No. 867,233 filed Oct. 17, 1969.

FIELD OF INVENTION

This invention relates to enclosure structures for converting vehicles either into security or detention carriers or into a means of transportation wherein the driver or passengers or both are protected from persons outside the vehicle.

BACKGROUND

Prior to this invention, van-type vehicles have been specially manufactured to transport prisoners or to protect passengers against outsiders. Frequently, however, such specially constructed vehicles are not available or readily obtainable or do not have sufficient capacity to handle different situations such as the transportation of prisoners from a battle zone, the transportation of detained rioters from a disturbed area, or the transportation of armed service personnel or security personnel (such as police) in dangerous areas. Makeshift constructions to meet emergency conditions usually are inadequate to meet the needs arising from the types of situations mentioned above. Furthermore, vans which are permanently and specially constructed to meet security needs, are not versatile primarily because the security enclosure cannot be dissembled or removed.

SUMMARY OF INVENTION, OBJECTS AND DESCRIPTION OF DRAWINGS

The present invention contemplates the provision of a novel modular security enclosure construction which fulfills the foregoing needs and which comprises a series of knockdown panels in the form of a conversion kit for easily and quickly converting nonsecurity and unprotected type vehicles so that they can be used as security carriers to transport detained persons or to protect personnel being transported through dangerous or disturbed areas.

In one embodiment, the kit of this invention is constructed to convert an army-type truck having an open load or passenger-carrying bed and a partially enclosed driver's compartment. The panels in the kit are detachably assembled on the truck to define side, front, and rear walls and a roof for enclosing the passenger of load receiving space on the bed. Additional protective panels are provided in the kit for detachable assembly over the windshield, side windows and roofless or canvas top of the driver's cab.

The panels defining the enclosure over the bed of the truck are interlocked in such a manner that they cannot be dissembled from either inside or outside the enclosure without first removing or opening at least one panel which, in this embodiment is a door providing an ingress and egress opening for the enclosure. The door may be latched or locked from the outside to prevent egress, or it may be constructed to be latched or locked from the inside to prevent ingress.

According to a further feature of this invention the enclosure-defining knockdown panels are interlocked without the use of any kind of fasteners such as, for example, screws or nut and bolt assemblies. This is accomplished by providing interlocking formations or parts on the panels so that each panel interlocks with one or more adjacent panels. The interlock construction prevents removal of the panels without first removing at least one predetermined panel and is such that the panels must be assembled and dissambled in a predetermined sequence. Furthermore, the interlocking construction of this invention and the construction detachably mounting the array of panels on the vehicle avoid the necessity of making any modification to the vehicle in order to assemble the enclosure-defining panels on the vehicle. The interlock construction comprises an arrangement of locking tabs or flanges on the panels.

The panel conversion kit of this invention is furthermore lightweight and can be packaged for shipment in a relatively small container. For example, a typical conversion kit for a 2½ ton, armed service 6 by 6 truck weighs approximately 650 pounds and can be packaged in a container that is 2½ feet high, 8 feet long, and 3 feet wide. It therefore can easily and readily be transported by aircraft or ground surface carriers to a desired location.

Owing to the fact that no separate fasteners of any kind are needed to assemble the kit on a vehicle, that the individual panels are lightweight, and that there is a simplified, predetermined sequence of assembly, the panels in the kit are quickly and easily assembled on the vehicle. For example, an untrained crew of three men can assemble the panels on a 2½ ton armed service truck in about 5 minutes, and a trained crew of three men can do the same job in about 2 minutes. Furthermore, one man can assemble the panels on the vehicle if necessary, and since there are no tool-manipulated fasteners, no tools of any kind are needed to assemble the panels. The absence of such fasteners in the security enclosure conversion kit is additionally advantageous because fasteners such as screws or nut and bolt assemblies are easily lost, particularly in the field or battle areas.

According to a further feature of this invention, the enclosure panels are constructed with steel mesh faced with a special, semi-reflective louver screen which eliminates any view of the enclosed space from outside the vehicle. This prevents outsiders from sighting enclosed passengers to fire at them with firearms. The steel mesh construction and framing provides a strength equivalent to that of a modern jail. Also the mesh and screen afford air circulation for the comfort of passengers in the enclosure, but prevents, substantially, the passage of liquids. Objects such as rocks, firebombs (Molotov cocktails), and other throwable items are repelled by the spring effect of the outside louver screens on the panels.

With the foregoing in mind it is a primary object of this invention to provide a knockdown assembly of panel-like modular units for quickly and easily assembling a security enclosure on a vehicle to convert the vehicle into a carrier for transporting prisoners or for protecting passengers to be transported from persons outside the vehicle.

A more specific object of this invention is to provide a novel knockdown enclosure assembly which is assembled on the vehicle without the use of tool-manipulated fasteners of any kind.

Another more specific object of this invention is to provide a novel knockdown, vehicle conversion, security enclosure kit comprising a series of panels which are interlocked in such a manner as to prevent the removal of the panels when at least one panel providing an ingress-egress opening for the enclosure is closed.

Still another more specific object of this invention is to provide the panels of the enclosure-defining security with a strong mesh faced with a louver screen which provides for air circulation through the enclosure, but which is strong enough to repel thrown objects and to prevent prisoners from breaking out. Also the louver screen obscures a view of the interior of the enclosure for the previously mentioned advantageous reasons.

Further objects of this invention will appear as the description proceeds in connection with the appended claims and annexed drawings wherein:

FIG. 3 is a fragmentary top plan view of the truck and enclosure assembly shown in FIG. 1;

FIG. 4 is an exploded view of the enclosure-defining front or forward panels for the truck bed and a portion of the truck bed structure;

FIG. 5 is a section taken substantially along lines 5—5 of FIG. 4;

FIG. 6 is a perspective view of the forwardmost, right hand, truck bed enclosure side panels shown in FIG. 1;

FIG. 9 is a section taken substantially along lines 9—9 of FIG. 3;

FIG. 10 is a section taken substantially along lines 10—10 of FIG. 3;

FIG. 11 is an elevation of the right-hand, rearward side panel of the truck bed enclosure assembly as viewed from within the enclosure;

FIG. 12 is a right-hand end elevation of the panel shown in FIG. 11;

FIG. 13 is a section taken substantially along lines 13—13 of FIG. 6;

FIG. 14 is a fragmentary elevation of the truck bed enclosure center rear panel shown in FIG. 2;

FIG. 15 is an enlarged fragmentary perspective view of the right hand forward corner of the truck cab; and FIG. 16 is a section taken substantially along lines 16—16 of FIG. 15.

DETAILED DESCRIPTION

The preferred embodiment of this invention is described for use with a 2½ ton armed service 6 × 6 truck. It will be appreciated, however, that the security conversion kit of this invention is also applicable to other types of vehicles.

Figure 1:
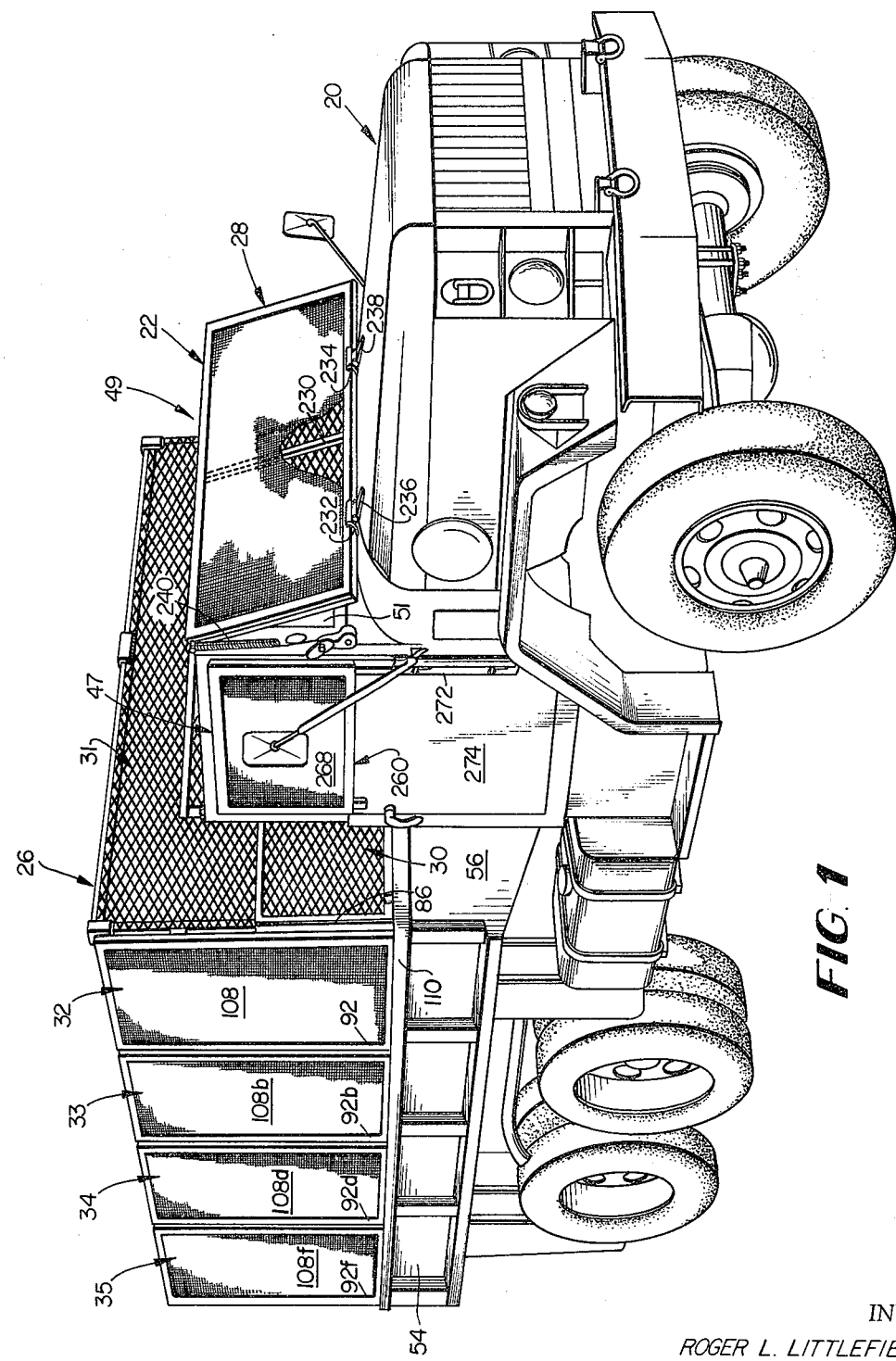
FIG. 1 is a perspective view of a 2½ ton armed service 6 by 6 truck and illustrates the security conversion kit of this invention assembled on the passenger or load-carrying bed structure of the truck and also on the cab of the truck.
Figure 2:
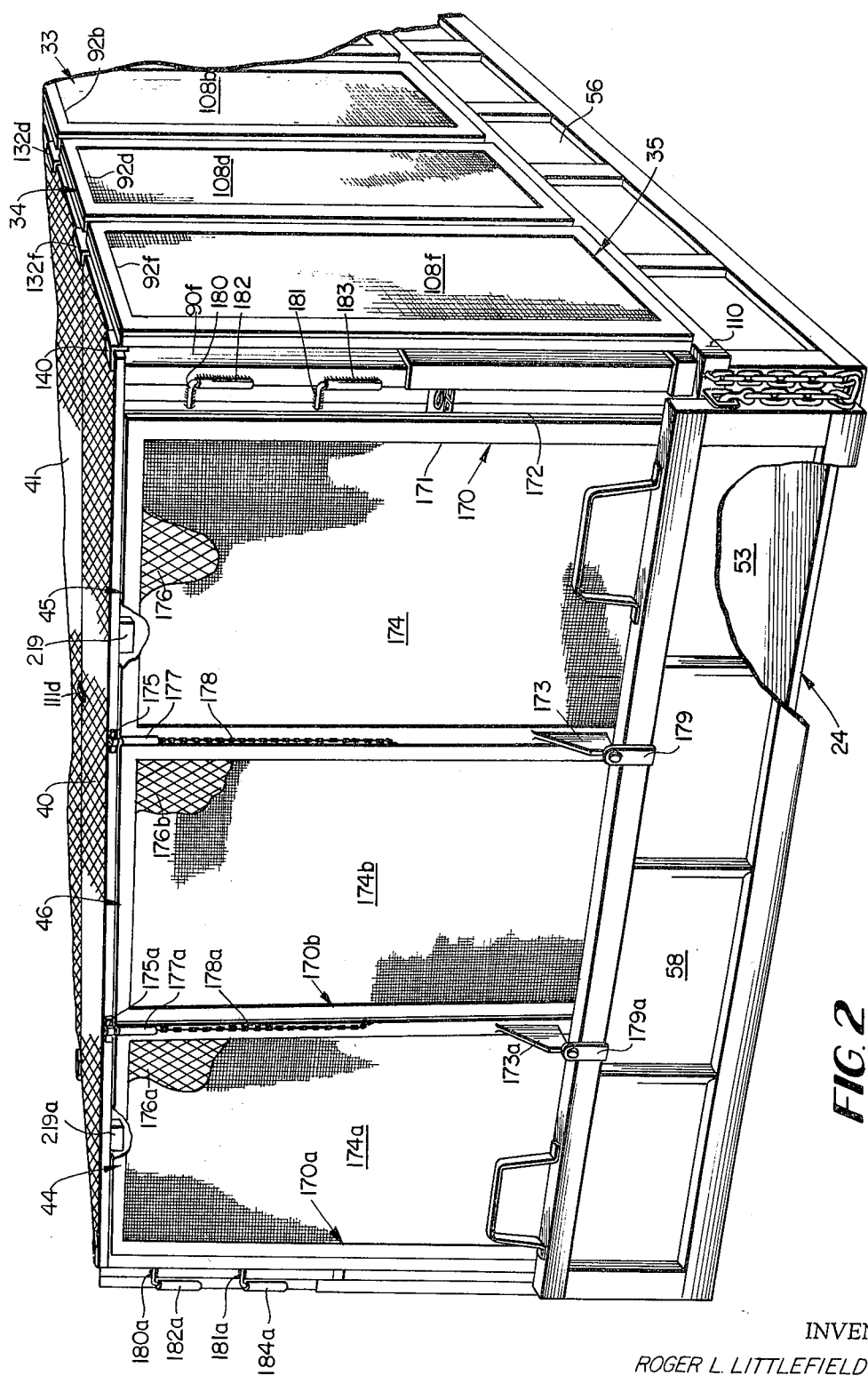
FIG. 2 is an enlarged fragmentary perspective view of the truck and the enclosure as seen from the rear, right hand corner of the vehicle.

Referring now to the drawings and more particularly to FIGS. 1 and 2, the vehicle to be converted with the conversion kit of this invention is, as mentioned above, shown to be a standard 2½ ton armed forces truck 20 having a driver's cab 22 (FIG. 1) and an open load or passenger receiving bed structure 24 (FIG. 2) extending rearwardly from cab 22. The conversion kit of this invention is divided into two assemblies 26 and 28.

Assembly 26, as shown in FIGS. 2–4, comprises a series of separately formed panels 30, 31, 32, 33, 34, 35, 36, 37, 38, 39, 40, 41, 42, 43, 44, 45, and 46 for enclosing the truck bed structure 24 which is regarded to be open owing to the fact that it is either exposed or merely covered only with a standard, unshown canvas roofing. Assembly 28 provides protection for the occupants of cab 22 and comprises a pair of protective panels 47 and 48 (see FIGS. 1 and 3) for the side windows of the cab and a protective panel 49 for the cab's windshield which is indicated at 51 in FIG. 1. For a truck of the type shown in FIG. 1, only a canvas roof is provided for cab 22, and assembly 28 consequently includes a further roof or top wall panel 50 for the cab as best shown in FIG. 3. Panels 30–50 are of rectangular configuration as shown.

The enclosure defined by the assembly of panels 30–46, as best shown in FIGS. 1 and 2, is of inverted box-shaped configuration having a top wall or roof, two opposed side walls, and opposed front and rear endwalls. Panels 30 and 31, as shown in FIG. 1, define the front end wall of the enclosure. Panels 32–35 define one of the side walls of the enclosure as shown in FIG. 1, and panels 36–39 form the other of the two side walls as shown in FIG. 3. Panels 40–43 define the top wall of the enclosure as shown in FIG. 3, and panels 44–46 define the rear end wall of the enclosure as shown in FIG. 2.

The bed structure 24 conventionally includes a pair of side panels 54 (one shown in FIGS. 1 and 2), a forward end panel 56 (FIG. 1), and a rear tailgate 58 (FIG. 2). Panels 54 and 56 are of relatively short height and extend upwardly from the edges of bed 53 in the usual manner. Panel assembly 26 cooperates with the truck bed structure 24 to enclose the load or passenger receiving space on bed 53.

As shown in FIG. 4, panel 30 comprises a rectangular, rigid metal frame 62 which is divided into three sections of essentially equal area by two vertical, intermediate structural members 63 and 64. Frame 62 may be formed from any suitable structural members of sufficient strength such as, for example, angle irons. Mounted on the three framework sections defined by frame 62 and structural member 63 and 64 is a stiff, strong screen 65 which is preferably formed from suitable expanded metal mesh and which is preferably welded or otherwise suitably fixed to frame 62 and structural member 63 and 64. Structural members 63 and 64 add rigidity to frame 62 and strengthen the expanded metal screen 65.

With continued reference to FIG. 4, structural members 63 and 64 are respectively provided with extensions in the form of rigid, downwardly extending support posts 70 and 71 which are interfittingly received in existing stanchion holes 73 and 74. Stanchion holes 73 and 74 are formed in the upper edge of the forward, truck bed panel 56 as shown. A pair of rigid pins 76 and 77, which are fixed to the bottom horizontally extending portion of frame 62 adjacent to the opposite sides of the frame, are interfittingly received in existing holes 78 and 79 which are also formed in the upper edge of panel 56. Posts 70 and 71 are slidably insertable into stanchion holes 73 and 74 respectively, and pins 76 and 77 are slidably inserted into their respective holes 78 and 79. When assembled on the truck, the bottom horizontally extending portion of frame 62 seats on the upwardly facing edge of panel 56. Panel 30 is substantially coextensive with panel 56 and spans the truck bed side panels 54.

To removably mount panel 30 on the truck bed structure 24, posts 70 and 71 need only be aligned with stanchion holes 73 and 74, and pins 76 and 77 need only be aligned with holes 78 and 79. Upon effecting this alignment, panel 30 then is simply dropped into place to seat on the upper edge of panel 56 as previously described.

It will be appreciated from the foregoing description that no fasteners of any kind are required for mounting panel 30 on the truck bed structure 24. Furthermore, no modification of truck 20 is required for mounting panel 30 on the truck bed structure.

Posts 70 and 71, when received in stanchion holes 73 and 74 provide a separable interlock that prevents the lower edge of panel 30 from being pushed outwardly from the inside of the enclosed space or from being pushed inwardly from the outside of the truck. Pins 76 and 77 when received in holes 78 and 79 prevent the ends of panel 30 from being bent or pushed inwardly or outwardly respectively by forces exerted from outside the enclosure and from inside the enclosure. To remove panel 30, it is only necessary to lift the panel until the ends of posts 70 and 71 clear the stanchion hole 73 and 74. Frame 62 is sufficiently rigid that its upper edge cannot be bent forward to any significant degree when assembled and interlocked with other panels of the enclosure as will presently appear.

Panel 31, which seats on top of panel 30, is similar to panel 30, and to the extent that panel 31 is like panel 30, like reference numerals suffixed by the letter $a$ have been used to identify the parts of panel 31. Panel 31 differs from panel 30 mainly in that it does not have any pins such as pins 76 and 77 and in that the support posts 70a and 71a instead of being aligned with structural member 63a and 64a are aligned with and extend downwardly from the vertically extending portions of frame 62a.

As shown in FIGS. 4 and 5, the lower, horizontally extending portion of frame 62a is seated on the horizontally extending legs of two L-shaped locking flanges 82 and 83. The horizontally extending leg portions of flanges 82 and 83 are preferably welded or otherwise suitably fixed to the upwardly facing edge of the upper horizontally extending portion of frame 62. Flanges 82 and 83 are thusly fixed to frame 62 preferably equidistantly from the vertically extending portions of frame 62. The vertical leg portions of flanges 82 and 83 extend upwardly in overlapping relation to the inwardly facing side edge of the lower, horizontally extending portion of frame 62a. Flanges 82 and 83, in addition to supporting panel 31 on panel 30, coact with the inwardly facing edge of the lower horizontally extending portion of frame 62a to provide an interlock between panels 30 and 31 which prevents the lower edge of panel 31 from being pushed inwardly by exterior forces.

Posts 70a and 71a are slidably received in existing, front corner stanchions 86 and 87 which form a standard part of truck 20. Panel 31 is readily and easily assembled in place by positioning it over panel 30, by aligning posts 70a and 71a with the openings in stanchions 86 and 87 and by dropping panel 31 downwardly to insert posts 70a and 71a into stanchions 86 and 87. Thus, it will be appreciated that to mount panel 31 in place, no fasteners of any kind are required, and no modifications to truck 20 are required. Panel 31 is substantially coextensive with panel 30.

As best shown in FIG. 6, panel 32 is a rigid, dual frame construction having an inner frame 90 and an outer frame 92. Both frames 90 and 92 are of rigid, rectangular construction and are fabricated from suitable, rigid structural members.

Figure 7:
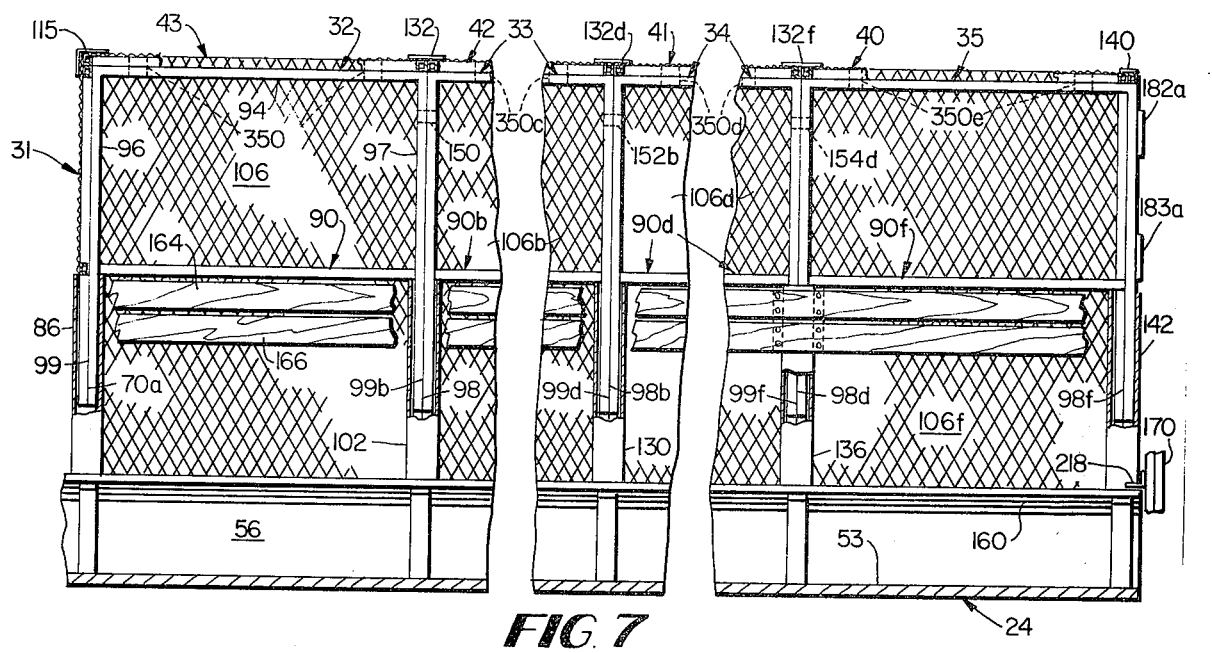
FIG. 7 is a section taken substantially along lines 7—7 of FIG. 3.

Inner frame 90 is formed by a pair of parallel spaced apart horizontally extending structural members 94 and 95 and a pair of vertically extending, rigid structural members 96 and 97 which are preferably welded to the opposite ends of members 94 and 95 as shown. Members 96 and 97 are provided with extensions in the form of legs 98 and 99 respectively. Legs 98 and 99 project vertically downwardly from member 95, and leg 99 is slidably received in corner stanchion 86 as best shown in FIG. 7. Leg 98 is slidably received in an existing, intermediate stanchion 102.

Leg 99 when received in stanchion 86 abuts post 70a, and the assembly of post 70a and leg 99 interfits in stanchion 86 so that abutment of the post and the leg against each other and the inner stanchion hole surfaces prevents the right hand portion of panel 31 from being pushed into or out of the enclosure. Confinement of leg 99 between post 70a and the opposed internal surface of stanchion 86 prevents edgewise displacement of panel 32. Also, abutment of legs 99 and 98 with internal stanchion hole surfaces prevents the lower portion of panel 32 from being pushed into or out of the enclosure.

Frame 92 is rigidly fixed to frame 90 by a plurality of block-shaped spacers which are indicated generally at 104. Fixed on the inside face of frame 92 is a relatively stiff, flat screen 106 of strong expanded metal. Frame 92 is a two-piece construction having an inner frame part 107 and an outer frame part 109 which are suitably rigidly fixed to each other by rivets or the like as best shown in FIG. 13. An outside screen 108 is securely clamped between frame parts 107 and 109 and is spaced from screen 106, again as shown in FIG. 13.

Screen 106 serves to confine detained persons or to protect passengers in the enclosure. Screen 108 which is more resilient than screen 106 is spaced from screen 106 so that it is springy to repel thrown objects.

As shown in FIGS. 1 and 7, the lower horizontally extending portion of frame 92 interfittingly seats on the border flange 110 of the truck bed side panel 54. Thus, frame 92 and screen 108 are disposed exteriorly of stanchions 86 and 102. This, as will become apparent from the subsequent description, provides a neat uninterrupted side exterior surface wherein the opposed side edges of panels 32, 33, 34, and 35 abut or are positioned very closely adjacent to each other to preclude the insertion of objects into the enclosure as well as precluding objects from being thrown out of the enclosure.

Figure 8:
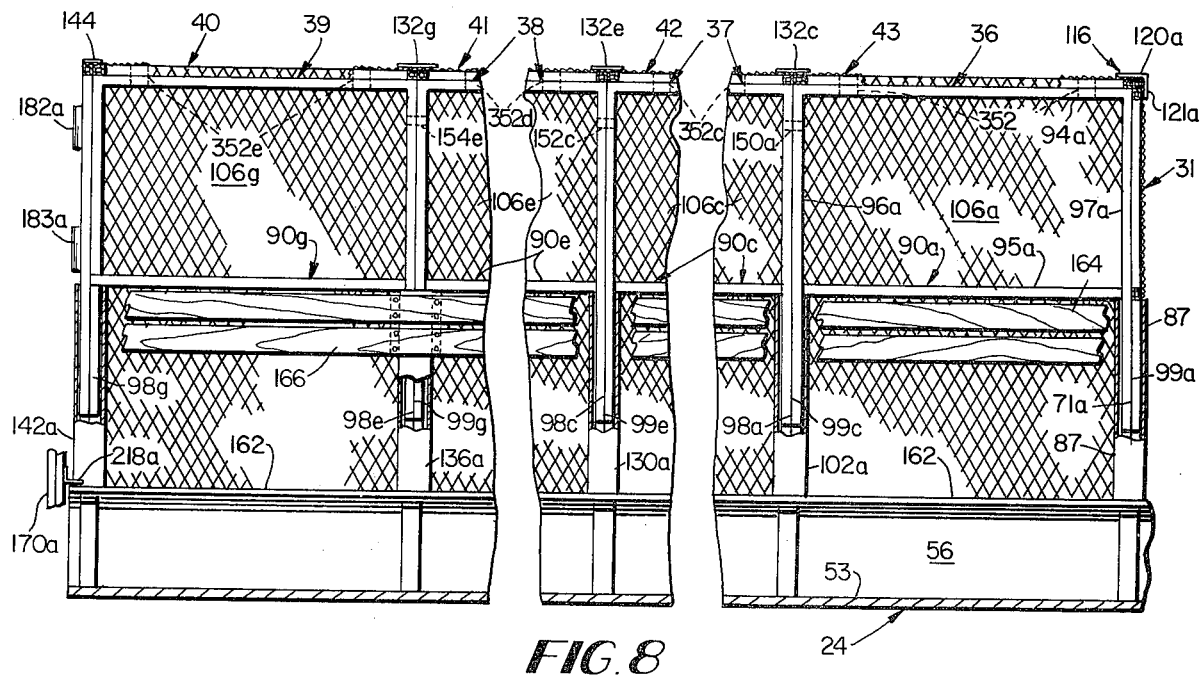
FIG. 8 is a section taken substantially along lines 8—8 of FIG. 3.

As best shown in FIG. 8, the construction of panel 36 is identical to that of panel 32. Accordingly, like reference numerals suffixed by the letter $a$ have been applied to the parts of panel 36 which correspond to the previously described parts of panel 32. Legs 99a and 98a are respectively slidably received in stanchion 87 and a further existing, intermediate stanchion 102a.

To mount panel 32 in place after panels 30 and 31 are assembled on the truck bed structure, panel 32 is first positioned over flange 110 to align legs 99 and 98 with the holed in stanchions 86 and 102 respectively. The panel is then dropped into place sliding legs 99 and 98 respectively into stanchions 86 and 102 as previously described. Panel 36 is assembled on the truck bed structure in the same manner as just described for panel 32.

From the foregoing it is clear that no fasteners of any kind are required to mount panels 32 and 36 in place. Furthermore, no modifications of any kind are required for mounting panels 32 and 36 on the truck bed structure. Panels 32 and 36 are readily and easily removed after panels 33–35 and 37–46 are removed simply by raising the panels until their legs clear their respective stanchions on the truck bed structure. Panel 36 may be assembled or removed before panel 32 is assembled or removed. Alternately, panels 32 and 36 may be assembled or removed concomitantly.

The assembly of post 71a and leg 99a interfits in stanchion 87 so that the abutment post 71a and leg 99a against each other and against the opposed internal surfaces of stanchions 86 prevents the left hand portion of panel 31 from being pushed into or out of the enclosure. Confinement of leg 99a between post 71a and the opposed internal surface of stanchion 87 prevents edgewise displacement of panel 36. Also, abutment of legs 99a and 98a with internal stanchion hole surfaces prevents the lower portion of panel 36 from being pushed into or out of the enclosure. Frame 92a seats on the flange 110 of the left hand truck bed side panel 56, with frame 92a and screens 106a and 108a being disposed exteriorly of stanchions 87 and 102a.

Panel 43 in some respects is similar to panel 30, and to the extent that panels 43 and 30 are alike, like reference numerals, suffixed by the letter b have been applied to designate the parts of panel 43. Panel 43 differs from panel 30 in that it does not have parts corresponding to pins 76 and 77 and posts 70 and 71. Panel 43 instead has a locking tab 111 for a purpose to be described in detail later on.

The side portions of frame 62b seat on the upper edges of the upper horizontally extending portions of frames 90 and 90a, and the forward or front portion of frame 62b seats on the upper edge of the upper horizontally extending portion of frame 62a as best shown in FIGS. 3, 7, 8 and 10. This prevents panel 43 from being pushed or pulled inwardly. The side portions of frame 62b either abut or are positioned closely adjacent to the upper horizontally extending portions of frames 92 and 92a. Abutment of frame 62b with frames 92 and 92a prevents sideward displacement of panel 43 by forces exerted from inside or outside the enclosure. Also abutment of frames 92 and 92a with frame 62b prevents the upper portions of panels 32 and 36 from being pushed or pulled inwardly.

A pair of locking flanges 115 and 116 are provided for interlocking the adjacently disposed corners of panels 31, 32, 36, and 43. An additional locking flange 114 provides a further interlock between panels 31 and 43.

With reference to FIGS. 3 and 4, flange 114 is of inverted L-shaped configuration having a vertical leg fixed as by welding to the upper horizontally extending portion of frame 62a equidistantly between the sides of frame 62a. The horizontally extending leg portion of flange 114 overlaps the forward transverse or end portion of frame 62b so that the forward portion of frame 62b is confined between the horizontally extending leg portion of flange 114 and the upwardly facing edge of the upper horizontally extending portion of frame 62a. Abutment of frame 62b with the horizontally extending leg portion of flange 114 prevents the central portion of the forward edge of panel 43 from being pushed or pulled upwardly.

Flange 115, as best shown in FIG. 6, comprises an inverted L-shaped portion 120 and a plate-like portion 121. The vertical leg of portion 120 is fixed as by welding to the inwardly facing surface of the upper, horizontally extending part of frame 92, and the horizontally extending leg of portion 120 overlaps the right hand forward corner of frame 62b as best shown in FIGS. 3 and 10. Abutment of the right hand, forward corner of frame 62b with the overlapping horizontal leg of portion 120 prevents the right hand corner of panel 43 from being pushed or pulled upwardly. Portion 121, which is preferably welded to portion 120, extends at right angles to the legs of portion 120 and overlaps the upper, right hand corner of frame 62a. This interlocking construction prevents the upper, right hand corner of panel 31 from being pushed or pulled outwardly from the enclosure.

As best shown in FIGS. 3 and 8, the construction of locking flange 116 is the same as that just described for flange 115, like reference numerals suffixed by the letter a being applied to the portions of flange 116. As shown, the vertical leg of portion 120a is fixed as by welding to the upper horizontally extending part of frame 92a, and the horizontal leg of portion 120a overlaps the forward, left hand corner of frame 62b to prevent the forward, left hand corner of panel 43 from being pushed or pulled upwardly. Portion 121a, which overlaps the upper, left hand corner of frame 62a, prevents the upper, left hand corner of panel 31 from being pushed or pulled outwardly.

Except for locking flange 115, panel 33 is essentially of the same construction as panel 32, like reference numerals suffixed by the letter b being applied to designate the parts of panel 33 as best shown in FIGS. 1 and 7.

With continued reference to FIG. 7, leg 99b is slidably received in stanchion 102 along with leg 98. Leg 98b is slidably received in another, existing, intermediate, upwardly opening stanchion 130. It will be noted that all of the previously described truck stanchions as well as those yet to be described are vertical and open upwardly.

The assembly of legs 98 and 99b in stanchion 102 as well as the confinement of panel 33 between panels 32 and 34 prevents edgewise displacement of panel 33. Also, engagement of legs 99b and 98b against the interior surfaces of stanchions 102 and 130 prevent the lower portion of panel 33 from being pushed or pulled inwardly or outwardly. The lower horizontally extending portion of frame 92b seats on the flange 110 of the right hand truck bed side panel 56.

The construction of panel 37 is the same as that just described for panel 33. Accordingly, like reference numerals suffixed by the letter c have been applied to designate those parts of panel 37 which correspond to panel 33.

As shown in FIG. 8, leg 99c is received in stanchion 102a, and leg 98c is received in another existing vertical, upwardly opening stanchion 130a. The lower horizontally extending portion of frame 92c seats on the border flange 110 of the left hand truck bed side panel 56. The assembly of legs 98a and 98c interfit in stanchion 102a to confine panel 37 against edgewise displacement. Also, panel 37 is confined against edgewise displacement between panels 36 and 38.

The assembly of frames 92b and screens 106b and 108b is disposed exteriorly of stanchion 102 and 130. Similarly, the assembly of frame 92c and screens 106c and 108c is disposed exteriorly of stanchions 102a and 130a.

In place of flange 115, panel 33 is provided with a locking flange 132 having an inverted L-shaped configuration. The vertical leg of flange 132 is fixed as by welding to the inside face of the forward, upper corner of frame 92b and projects forwardly into the space between frames 90 and 92 in the region of the rearward upper corner of panel 32 to thus interlock the adjacent upper corners of panels 32 and 33 and to thereby preclude either panel from being pushed or pulled inwardly or outwardly relative to the other. The horizontal leg portion of flange 132 overlaps the right, rear corner of frame 62b. Abutment of the right rear corner of frame 62b with the horizontal leg of flange 132 prevents the right rear corner of panel 43 from being pushed or pulled outwardly.

Panel 37 also is provided with a flange 132c which is identical to flange 132. Flange 132c is fixed to frame 92c in the same manner as that described for flange 132. The vertical leg portion of flange 132c extends between frames 92a and 90a in the region of the rear upper corner of panel 36 to thus interlock panels 36 and 37 and thereby prevent the adjacently disposed regions of either panel from being pushed or pulled inwardly or outwardly relative to the other panel. The horizontal leg of flange 132c overlaps the left rear corner of frame 62b. Abutment of frame 62b with the horizontal leg of flange 132c prevents the left rear corner of panel 43 from being pushed or pulled upwardly.

The horizontal legs of flanges 115 and 132 and the opposing surface of the upper horizontally extending portion of frame 92 provide a right hand channel for slidably receiving the right marginal side edge of panel 43. Similarly, the horizontal legs of flanges 116 and 132c and the opposing surface of the upper horizontally extending portion of frame 92a define a left hand channel for slidably receiving the marginal left hand edge of panel 43. To mount panels 43 in place, therefore, it is merely slid into the right and left hand channels mentioned above. Abutment of the forward corners of frame 62b with flange portions 121 and 121a prevent panel 43 from being slid forwardly from its illustrated position by forces exerted interiorly or exteriorly of the enclosure.

After panels 30–32, 36 and 43 are assembled, panels 33 and 37 are then assembled by positioning each panel with its legs aligned over its respective stanchion holes and by dropping the panel down into place. It thus will be appreciated that no fasteners of any kind are required to mount panels 33 and 37 in place. Furthermore, no modifications to truck 20 are required for mounting panels 33 and 37 on the truck bed structure 24. Panels 33 and 37 are readily and easily removed after panels 34, 35 and 38–46 are removed simply by raising the panels until their legs clear their respective stanchions on the truck bed structure. Panel 37, of course, may be assembled or removed before panel 33 is assembled or removed.

With the exception of the locking tab construction, panel 42 is of the same construction as panel 43. Accordingly, like reference numerals suffixed by the letter c have been applied to designate corresponding parts of panel 42.

As shown in FIGS. 3 and 9, panel 42 has three plate-like locking tabs 134, 135 and 136 which extend forwardly from the forward transverse portion of frame 62c. The adjacently disposed portion of frame 62b overlaps tabs 134–136 so that abutment of tabs 134–136 with the rearward transverse portion of frame 62b prevents the forward edge of panel 42 from being pushed or pulled upwardly. Tabs 134–136 also prevent the rearward edge of panel 43 from being pushed or pulled downwardly.

Tab 111, which is fixed to frame 62b, extends over the forward transverse portion of frame 62c. As a result, abutment of frame 62c with tab 111 prevents panel 42 from being pushed or pulled upwardly along its forward edge. Also, abutment of tab 111 with frame 62c prevents the rearward edge of panel 43 from being pushed or pulled downwardly.

The horizontally extending legs of flanges 132 and 132c overlap the forward right and left corners of frame 62c. Thus abutment of the right and left corners of frame 62c with the horizontal legs of flanges 132 and 132c prevent the right and left forward corners of panel 42 from being pushed or pulled upwardly.

The side portions of frame 62c seat on the upwardly facing edge surfaces on the upper horizontally extending portions of frames 90b and 90c. This prevents panel 42 from being pushed or pulled downwardly. Abutment of frame 62c with opposing surfaces on frames 92b and 92c prevents sideward displacement of panel 42. Abutment of frames 92b and 92c with the side portions of frame 62c prevent panels 33 and 37 from being pushed or pulled inwardly.

With continuing reference to FIGS. 3 and 7, panel 34 is of substantially the same construction as panel 33. Accordingly, like reference numerals suffixed by the letter d have been applied to designate the corresponding parts of panel 34. As shown in FIG. 7, leg 99d is slidably received in stanchion 130, and the assembly of legs 98b and 99d interfit in the stanchion to restrain displacement of panel 34 in the same manner described in connection with panel 33. Also, panel 34 is confined against edgewise displacement by confinement between panels 33 and 35. Leg 98d is slidably received in another existing, intermediate, vertical, truck stanchion 136. The lower horizontally extending portion of frame 92d seats on flange 110 of the right hand bed structure side panel 56.

As shown in FIG. 8, panel 38 is of identical construction as panel 37. Accordingly, like reference numerals suffixed by the letter e have been applied to designate the corresponding parts of panel 38. Legs 99c and 98e are slidably received in stanchion 130a and another existing intermediate, vertical, upwardly opening stanchion 136a.

The reception of legs 99d and 98d in stanchions 130 and 136 as well as the confinement of panels 34 between panels 33 and 35 prevent edgewise and sideward movement of panel 34 in the manner similar to that described for panel 33. Similarly, edgewise and sideward movement of panel 38 is prevented by reception of legs 99e and 98e in stanchions 130a and 136a as well as confinement of panel 38 between panels 37 and 39. After panels 30–33, 36, 37, 42 and 43 are assembled, each of the panels 34 and 38 are readily and easily mounted in place by positioning the legs of each panel in alignment with its respective stanchions and by dropping the panel down into place. After panels 35, 44–46 are removed, panel 34 is simply and easily removed by lifting it until its legs 99d and 98d clear stanchions 130 and 136. After panels 35, 39, 40, 41 and 44–46 are removed, panel 38 is simply and easily removed simply by lifting it until its legs 99e and 98e clear stanchions 130a and 136a. It therefore will be appreciated that no fasteners of any kind are required for mounting panels 34 and 38 in place. Also, no modification of any kind is required for mounting panels 34 and 38 on truck 20. Panels 34 and 38 may be assembled and removed in any selected order or they may be assembled and removed concomitantly. The screens and outer frames of panels 34 and 38 are disposed exteriorly of their respective stanchions.

As shown in FIG. 3, panel 41 is of the same construction as panel 42. Accordingly, like reference numerals suffixed by the letter d have been applied to designate those parts of panel 41 which correspond to panel 42.

As shown in FIGS. 7 and 8, the right and left side portions of frame 62d seat on the upper horizontally extending portions of frame 90d and 90e. This prevents panel 41 from being pushed or pulled downwardly. Abutting engagement of the side portions of frames 62d with the opposed surfaces on frames 92d and 92e prevent sideward movement of panel 41. Also, abutment of frames 92d and 92e with the opposing side portions of frame 62d prevent the upper edges of panels 34 and 38 from being pushed or pulled inwardly.

Locking tabs 134d and 136d as well as the unshown tab corresponding to locking tab 135 are fixed to the forward transversely extending portion of frame 62d and extend under the adjacent transversely extending rearward portion of frame 62c. Abutment of these tabs, which are welded to frame 62d, with frame 62c thus prevents the forward edge of panel 41 from being pushed or pulled upwardly. Tab 111c which is fixed as by welding to the rearwardly extending transverse portion of frame 62c extends over the forwardly extending transverse portion of frame 62d to thus prevent the rearwardly extending edge of panel 42 from being pushed or pulled downwardly.

The horizontal leg of flange 132d overlaps the right hand forward corner of frame 62d. Thus, abutment of the right forward corner of frame 62d with the horizontal leg of flange 132d prevents the right hand corner of panel 41 from being pushed or pulled upwardly. Similarly, the horizontal leg of flange 132e overlaps the left hand forward corner of frame 62d. As a result, abutment of frame 62d with the horizontal leg of flange 132e prevents the left hand corner of panel 41 from being pushed or pulled upwardly.

As best shown in FIGS. 7 and 11, the construction of panel 35 is essentially the same as that just described for panel 34 with the exception that a further locking tab 140 has been added on the top rearward corner of the panel 35. Accordingly, like reference numerals suffixed by the letter f have been applied to designate the corresponding parts of panel 35.

Legs 99f and 98f are, as shown in FIG. 7, respectively slidably received in stanchion 136 and a further, existing, vertical, right rear corner truck stanchion 142. The lower horizontally extending portion of frame 92f seats on flange 110 of the right hand truck bed structure side panel 56. Sidward and edgewise movement of panel 35 is restrained by abutment of legs 99f and 98f with opposing surfaces in stanchions 136 and 142. The assembly of frame 92f and screens 106f and 108f is disposed exteriorly of stanchions 136 and 142 as best shown in FIG. 1.

The vertical leg of flange 132f extends between frames 90d and 92d in the region of the rearward upper corner of panel 34. This interlocks panel 34 and 35 to prevent either of the two panels from being pushed or pulled inwardly or outwardly relative to the other. The horizontal leg of flange 132f overlaps the rearward right corner of frame 62d. Thus, abutment of frame 62d with the horizontal leg of flange 132f prevents the rearward right corner of panel 41 from being pushed or pulled upwardly.

As best shown in FIG. 8, the construction of panel 39 is the same as that described for panel 38 except that a further locking flange 144 has been added to the upper rearward corner of panel 39. Accordingly, like reference numerals suffixed by the letter g have been applied to designate corresponding parts of panel 39.

Legs 99g and 98g are slidably and interfittingly received in stanchions 136a and a further existing vertical, upwardly opening, left rear corner truck stanchion 142a. The lower horizontally extending portion of frame 92g seats on flange 110 of the left hand truck bed structure side panel 56. Confinement of panel 39 against edgewise and sideward movement is similar to that described for panel 35.

The vertical leg portion of flange 132g extends between frames 90e and 92e in the rearward upper corner of panel 38. This interlocks panels 39 and 38 to prevent either of the two panels from being pushed or pulled inwardly or outwardly relative to the other. The horizontal leg of flange 32g overlaps the left corner of frame 62d. Thus, abutment of frame 62d with the horizontal leg of flange 132g prevents the left rear corner of panel 41 from being pushed or pulled upwardly.

The horizontal legs of flanges 132d and 132f cooperate with the upper horizontally extending portion of frame 90d to provide a right hand channel which slidably receives the right hand marginal side edge of panel 41. Similarly, the horizontally extending legs of flanges 132e and 132g cooperate with the upper horizontally extending portion of frame 90e to provide a left hand channel which slidably receives the left hand marginal edge of panel 41. Thus the right and left hand sides of panel 41 are easily slid into the channels mentioned above to position panel 41 in the manner shown in FIG. 3. It therefore will be appreciated that no fasteners of any kind are required to mount panel 41 in place.

After panels 30–34, 36–38, and 41–43 are assembled, panel 35 is simply and easily assembled in place by aligning legs 99f and 98f with stanchions 136 and 142 respectively and by dropping the panel down into place. After panels 30–34 and 36–38 and 41–43 are assembled, panel 39 is easily removably assembled in place by aligning legs 99g and 98g respectively with stanchions 136a and 142a and by dropping the panels down into place. Panels 35 and 39 may be assembled in any selected order, or they may be assembled concomitantly.

After panels 44–46 and 40 are removed, panels 35 and 39 may be removed concomitantly or in any selected order simply by lifting each panel until its legs clear its respective stanchions. From the foregoing it will be appreciated that no fasteners of any kind are required to mount panels 35 and 39 in place. Also, no modification of truck 20 is required for mounting or removing panels 35 and 39.

As shown in FiG. 3, the construction of panel 40 is the same as panel 41 with the main exception that the tab corresponding to locking tab 111d has been eliminated. Accordingly, like reference numerals suffixed by the letter e have been applied to designate the corresponding parts of panel 40.

As shown in FIG. 3, the locking tabs 134e and 136e as well as the unshown locking tab corresponding to tab 135 are fixed to the forward transversely extending portion of frame 64e and are overlapping by the rearward transversely extending portion of frame 62d. Abutment of these locking tabs with the rearward transversely extending portion of frame 62d prevents the forward edge of panel 40 from being pushed or pulled upwardly.

Locking tab 111d overlaps the forward transversely extending portion of frame 62e. Thus, abutment of locking tab 111d with frame 62e prevents the rearward edge of panel 41 from being pushed or pulled downwardly.

The side portions of frame 62e seat on the upper horizontally extending portions of frame 90f and 90g. This prevents panel 40 from being pushed or pulled downwardly. Sideward movement of panel 40 is prevented by abutting engagement of the side portions of frame 62e with opposing surfaces on frames 92f and 92g in a manner similar to that previously described for the other top or roof panels. Also, abutment of frames 92f and 92g with the side portions of frame 62e prevent the upper portions of panels 35 and 39 from being pushed or pulled inwardly.

As shown in FIGS. 11 and 12, flange 140 is formed with an inverted, L-shaped configuration having a vertical leg fixed as by welding to the inside face of the upper rear corner of frame 92f. The horizontal leg of flange 140 overlaps the right rear corner of frame 62e as shown in FIG. 3. Thus, abutment of frame 62e with the horizontal leg of flange 140 prevents the right rear corner of panel 40 from being pushed or pulled upwardly. Flange 144 is of the same construction as flange 140 and has a vertical leg which is fixed as by welding to the inside face of the upper rear corner of frame 92g. The horizontal leg of flange 144 overlaps the left rear corner of frame 62e. Thus, abutment of frame 62e with the horizontal leg of flange 144 prevents the left rear corner of panel 40 from being pushed or pulled upwardly.

The horizontal legs of flanges 132f and 140 cooperate with the upper horizontal portion of frame 90f to provide a right hand channel for slidably receiving the right hand side portion of panel 40. Similarly, the horizontal legs of flanges 132g and 144 cooperate with the upper horizontal portion of frame 90g to provide a left hand channel which slidably receives the left hand side portion of panel 40. Panel 40 is thus assembled by slidably inserting the panel into the channels mentioned above after panels 30–39 and 41–43 have been assembled. It therefore will be appreciated that no fasteners of any kind are required for mounting panel 40 in place.

The assembly of frame 92f and screens 106f and 108f are disposed exteriorly of stanchions 136 and 142 as best shown in FIG. 1. Similarly, the assembly of frame 92g and screens 106g and 108g is disposed exteriorly of stanchions 136a and 142a. Panels 40–42 are coextensive with panel 43, and all four panels 40–43 span the space between the side walls defined on the right side by panels 32–35 and on the left side by panels 36–39.

As shown in FIG. 7, a further locking tab 150 is fixed as by welding to the rearward vertical portion of frame 92 and extends between frames 90b and 92b to provide a further interlock between panels 32 and 33 in the same manner that the vertical leg portion of flange 132 interlocks the two panels. A similar locking tab 150a is fixed to panel 36 as shown in FIG. 8 and extends between frames 90c and 92c to provide a further interlock between panels 36 and 37 in a manner similar to the interlock provided by locking tab 150.

Referring back to FIG. 7, a locking tab 152b is fixed to frame 90b and extends between frames 90d and 92d to provide an interlock between panels 33 and 34 in the same manner as described in connection with locking tab 150. A similar locking tab 152c is fixed as by welding to frame 92c and extends between frames 90e and 92e to provide another interlock between panels 37 and 38 in the manner similar to that described in connection with locking tab 150a.

Referring again to FIG. 7, still another locking tab 154d is fixed as by welding to frame 92d and extends between frames 90f and 92f to provide a further interlock between panels 34 and 35 in the manner similar to that described in connection with locking tab 150. Also, a locking tab 154e (see FIG. 8) is fixed to frame 92e and extends between frames 90g and 92g to provide a further interlock between panels 38 and 39 in the manner similar to that described in connection with locking tab 150a.

As shown in FIGS. 7 and 8, truck 20 is conventionally provided with right hand and left hand wooden bench seats 160 and 162 which are pivotable between their illustrated seating positions and raised or upright positions.

The backrests for bench seats 160 and 162 are respectively indicated at 164 and 166. As shown, bench seats 160 and 162 and backrests 164 and 166 are contained within the enclosure defined by panels 30–46.

As shown in FIG. 2, panel 45 comprises a two-piece frame 170 having two frame parts 171 and 172 which are securely fixed to each other by rivets or other suitable means, an outer screen 174 which is clamped between frame parts 171 and 172, and an inner screen 176 which is fixed as by welding to the inner face of frame part 172 in spaced relation to outer screen 174.

Screen 174 is preferably made from the same material as screens 108, 108a, 108b, 108d, 108e, and 108g. The material for these screens is conventional and preferably is a woven, louvered, bronze shade screen material manufactured by Coolshade Corporation of Glendale, Calif. Inner screen 176 preferably is made from relatively stiff, strong expanded steel mesh.

Fixed to the right hand edge of frame 170 are a pair of hinges 180 and 181 which are formed from suitable steel rods and which are received in rigid vertical metal sleeves 182 and 183. Sleeves 182 and 183 are fixed as by welding to the rearward vertical portion of frame 90f. Sleeves 182 and 183 are axially aligned to thus provide a vertical pivot axis about which panel 45 is pivotable between the illustrated closed position and an outwardly-swung open position.

Panel 45 may be locked in its illustrated closed position by a spring biased bolt lock assembly 177 which is fixed to the upper left corner of frame 170. The lock bolt of assembly 177 is normally spring biased into a catch comprising a bracket 175 which is welded or otherwise suitably fixed on the rearward edge of frame 62e. A chain 178 secured to the bolt of assembly 177 extends downwardly and has a free end fixed by any sutiable means to frame part 171. By pulling chain 178, the bolt of assembly 177 is withdrawn from bracket 175 to release the lock provided between panel 45 and 40.

Still referring to FIG. 2, an additional latch is provided in the form of a locking tab 179 which is pivotably mounted on a support bracket 173 to be positioned over the upper flange of tailgate 58 when the tailgate is swung to its illustrated closed position. Bracket 179 is welded or otherwise suitably fixed to frame part 171 as shown.

Panel 44 and the latching or locking structure therefor is the same as that just described for panel 45. Accordingly, like reference numerals suffixed by the letter *a* have been applied to designate corresponding parts of panel 44. Sleeves 182*a* and 184*a* are fixed as by welding to frame 90*g*, and bracket 175*a* is fixed to the rearward edge of frame 62*e*. Panels 44 and 45 are thus hinged to swing outwardly from their illustrated closed positions.

Panel 46 in some respects is similar to panel 45, and to the extent that panels 46 and 45 are alike, like reference numerals suffixed by the letter *b* have been applied to designate the corresponding parts of panel 46. Panel 46 differs from panel 45 mainly in its hinge construction and in the latching construction for securing panel 46 in its illustrated closed position.

As shown in FIG. 14, panel 46 is provided with a pair of hinges 190 and 191. Hinges 190 and 191 comprise rigid metal rods which are fixed as by welding to frame 170*b* and which are received in aligned, rigid, metal sleeves 193 and 194 respectively. Sleeves 193 and 194 are fixed as by welding to the underside of the rearward transversely extending portion of frame 62*e*. Panel 46 is thus swingable about a horizontal axis between its illustrated closed position and an inwardly swung open position where the lower end of the panel is raised.

Still referring to FIG. 14, panel 46 is latched to panels 45 and 44 by slide bolt lock assemblies 196 and 197 respectively. Assembly 196 is conventional and comprises a bolt 198 which is slidable in a sleeve 199 for insertion into an axially aligned latching sleeve 200. Sleeve 200 is fixed as by welding to the underside of frame 170, and sleeve 199 is fixed as by welding to the lower portion of frame 170*b*.

Assembly 197 is of the same construction as assembly 196. Accordingly, like reference numerals suffixed by the letter *a* have been applied to designate corresponding parts of assembly 197. Sleeve 200*a* is fixed to the underside of frame 170*a* as by welding, and sleeve 197*a* is fixed as by welding to the lower portion of frame 170*b*.

After panels 30–39 and 40–43 are assembled in the previously described manner, panels 44–46 are assembled in any selected order, or they may be assembled concomitantly. Assembly of panel 45 is readily and easily effected by aligning hinges 180 and 181 with sleeves 182 and 183 and by lowering the panel to insert hinges 180 and 181 into sleeves 182 and 183. Similarly, panel 44 is readily and easily assembled by aligning its hinges with sleeves 182*a* and 184*a* and by lowering the panel to insert the hinges into the sleeves. With panels 44 and 45 either removed or in their opened positions, panel 46 is readily and easily assembled by aligning its hinges 190 and 191 with sleeves 193 and 194 and by sidewardly moving the panel to insert hinges 190 and 191 into sleeves 193 and 194. Panel 46 cannot be removed except by opening panel 44 or by removing panel 44. Panel 46 is swingable about its hinge axis into the interior of the enclosure defined by the assembly of panels 30–46.

As shown in FIG. 2, the upper flanged portion of tailgate 58 overlaps the lower portions of panels 44–46 when the tailgate is swung to its illustrated closed position. To open any one or more of the panels 44–46, it is therefore first necessary to swing locking tabs 179 and 179*a* away from their illustrated tailgate locking positions and to then swing tailgate 58 down to its opened position. Panel 46 then may be opened by sliding bolts 198 and 198*a* back to their unlocked positions and also by pulling on chains 178 and 178*a* to remove the bolts of assemblies 175 and 175*a* from the locking brackets 177 and 177*a*. All three panels now may be opened to provide ingress into and egress from the enclosure.

It will be appreciated from the foregoing that no fasteners of any kind are required for mounting panels 44–46 on panels 39, 43 and 35 respectively. Also, no modifications of any kind are required to truck 20 for assembling panels 44–46.

Owing to the interlocking construction previously described for panels 30–46, panels 30–46 can only be assembled and removed in a predetermined sequence. In assembly, it is necessary to assemble the panels in the following order: panel 30, panel 31, the sub-assembly of side panels 32 and 36, panel 43, the sub-assembly of side panels 33 and 37, panel 42, the sub-assembly of side panels 34 and 38, panel 41, the sub-assembly of side panels 38 and 39, panel 40, and finally the sub-assembly of panels 44–46. Removal of panels 30–46 is the reverse of the order for the assembly just described.

From the foregoing, it will further be appreciated that when panels 30–46 are assembled and when panels 44–46 are latched closed, none of the panels 30–39 may individually be disassembled or opened sufficiently to provide ingress or egress of objects or persons. Furthermore, it will be appreciated that no modification of any kind is required to truck 20 for mounting panels 30–46 in place. In addition, no separate fasteners of any kind are needed for assembling the panels in the manner just described. More particularly, no fasteners that require manipulation by tools (such as threaded type fasteners) are required for assembling panels 30–46.

As shown in FIG. 2, rigid bars 219 and 219*a* are welded to the underside of frame 62*e* to provide stops for limiting inward movement of panels 45 and 46 beyond their illustrated closed positions. This stop construction also prevents panel 40 from being displaced rearwardly when panels 44 and 45 are latched in their closed positions.

As shown in FIG. 8, an L-shaped locking flange 218 has a vertical leg welded to the inside face of frame part 172 and a horizontal leg which overlaps the rearward marginal edge of bench seat 160 when the bench seat is in its lowered, seating postion. Thus when panels 44–46 are latched closed and when the tailgate 58 is latched in its raised position, bench seat 160 cannot be raised and prevents the lower portion of panel 45 from being pulled inwardly. This interlock prevents detained persons from reaching outside to manipulate any of the locks for panels 44–46.

As shown in FIG. 8, locking flange 218*a* is of the same construction as flange 218, is welded to the inside face of frame part 172*a*, and coacts with bench seat 162 in the same manner as described in conjunction with flange 218 and bench seat 160.

The full opened positions of panels 44 and 45 may be such that in their fully opened positions panels 44 and 45 block removal of panel 40. It will be appreciated, however, that panels 44 and 45 may alternately be swingable sufficiently far to be out of the removal path of panel 40, thus allowing panel 40 to be disassembled while panels 44 and 45 are still hinged to panels 39 and 35 respectively.

From the foregoing description it will be appreciated that the assembly of panels 30–46 are detachably mounted on bed structure 24 without the use of fasteners of any kind. The assembly of panels 30–46 cannot be lifted as a unit off bed structure 24 owing to the frictional engagement of legs 70, 71, 70a, 71a, 98, 99, 98a, 99a, 98b, 99b, 98c, 99c, 98d, 99d, 98e, 99e, 98f, 99f, 98g, and 99g in their respective stanchion holes and also owing to the fact that it would be extremely difficult to keep the panel assembly centered or properly aligned with the bed structure stanchion holes to prevent the panel legs from canting and thereby interlocking with the internal stanchion hole surfaces.

From the foregoing description it will also be appreciated that the outer frames and screens of panels 32–39 are disposed exteriorly of the bed structure stanchions. This, in addition to providing a neat exterior, also provides two exterior side wall surfaces which are only interrupted by the relatively small clearance spaces between adjacently disposed ones of panels 32–39.

Referring now to FIGS. 1 and 15, panel 49 comprises inner and outer rigid rectangular frames 220 and 222. Frames 220 and 222 are constructed from any suitable structural members. Frame 222 has inner and outer frame parts 223 and 224 which are rigidly fixed together by rivets or other suitable means. Clamped between frame part 223 and 224 is an outer screen 226 which is preferably made from the same material as screen 108. An inner screen 228 is fixed as by welding to the inwardly facing side of frame 220 in spaced parallel relation to screen 226. Screen 228 is preferably formed from relatively stiff, strong expanded metal mesh.

Frame 220 is rigidly fixed to frame part 223 by any suitable means such as welding. An upstanding structural member 230 extends perpendicularly between the horizontally extending portions of frame 220 about midway between the side portions of frame 220. Structural member 230 is welded or otherwise suitably fixed to the horizontally extending portions of frame 220 to add rigidity to the frame and to provide further support for screen 228.

Still referring to FIGS. 1 and 15, a pair of rigid pipe sections 232 and 234 are fixed as by welding to the lower horizontally extending portions of frame 220 and respectively interfittingly seat in existing hood hinges 236 and 238 on the hood of truck 20. Corresponding ends of a pair of coiled springs 240 and 241 (see FIG. 3) are respectively anchored to the upper left and right hand corners of frame 220 by any suitable means. Springs 240 and 241 extend downwardly and have lower, hooked ends which are hooked over the existing windshield adjustment handles 244 on opposite sides of windshield 51. Springs 240 and 241 are tensioned to bias the upper edge of panel 49 downwardly into separable, firm seating engagement with the upper horizontally extending edge of the windshield frame and to further exert a downward force on panel 49 to firmly seat pipe sections 232 and 234 in hood hinges 236 and 238. Springs 240 and 241, by exerting the downwardly extending force just described, thus firmly wedge panel 49 between the upper edge of the windshield frame and hood hinges 236 and 238 to secure panel 49 in place.

From the foregoing it will be appreciated that no modifications of any kind are required to truck 20 for mounting panel 49 in place. To assemble panel 49, pipe sections 232 and 234 are first separably seated on hood hinges 236 and 238. Springs 240 and 241 are then extended to hook over the windshield adjustment handles 244. Pipe sections 232 and 234, being separably seated in hood hinges 236 and 238, provide a horizontal pivot axis extending along the lower edge of frame 220 to enable panel 49 to be swung rearwardly as springs 240 and 241 are extended, thus firmly wedging panel 49 between the upper edge of the windshield frame and hood hinges 236 and 238. Panel 49 is readily and easily removed by unhooking springs 240 and 241 and by lifting panel 49 off the vehicle.

As best shown in FIG. 15, panel 47 comprises a rectangular frame assembly 260 having inner and outer frames 261 and 262. Frame 262 is formed with inner and outer frame parts 264 and 265 which are securely fixed together by rivets or other suitable means. A screen 268 is securely clamped between frame parts 264 and 265 and is preferably fabricated from the same material used to form screen 108. An inner screen 270 is fixed as by welding to the inside face of frame 261 in spaced parallel relation to screen 268. Screen 270 is formed from relatively stiff, strong expanded metal mesh. Frame 262 is rigidly fixed to frame part 264 by any suitable means such as welding.

Still referring to FIG. 15, the forward vertical portion of frame 262 is provided with an extension in the form of a leg 272 which extends downwardly along the exterior of the cab door 274 adjacent to the hinged end of the door. Fixed to leg 272 as by welding are a pair of aligned, support hinge members 276 and 277 which are slidably received in aligned, existing metal side door hinge sleeve members 278 and 279.

When hinge members 276 and 277 are received in sleeve members 278 and 279, the subassembly of frame assembly 260 and screens 268 and 270 are positioned in front of the side window of cab door 274 in overlapping relation thereto.

As shown in FIG. 16, a rigid, horizontally extending structural member 278 has an upper vertically extending leg 279 fixed as by welding to the lower horizontally extending portion of frame 262. Structural member 278 is further formed with a downwardly extending vertical leg 280 and a horizontal leg 281 extending between and integrally joining legs 279 and 280.

When panel 47 is assembled on door 274, leg 280 is received in the window channel 284 which is formed between the inner and outer panels 285 and 286 of the door. Leg 281 seats on the upper edge of the outer door panel 286 as shown in FIG. 16. Leg 280 extends between the inside flanged end 288 of outer door part 286 and the window which is indicated at 290 in FIG. 16. Thus, member 278 does not interfere with the cranking of window 290 between its illustrated open position and its closed position.

Also fixed, as by welding, to frame 262 adjacent to the handle end of door 274 is a leg 292 which extends downwardly from frame 262 along the exterior of door 274 as shown in FIGS. 15 and 16. The lateral distance between leg 292 and leg 280 is just slightly greater than the width or thickness extending between the outer surface of door panel 286 and the inwardly facing, channel defining surface of the flanged end 288. Legs 292 and 280 thereby coact to provide an interlock which prevents the lower edge of the framed portion of panel 47 from being pushed or pulled inwardly or outwardly relative to door 274. In addition, seating engagement of leg 281 on the upper edge of outer door panel 286 provides further support for panel 47 on door 274.

Hinge members 276 and 277 coact with the existing hinge sleeve 278 and 279 to keep the upper edge of the framed portion of panel 47 from being pushed inwardly and outwardly. Also, the length of leg 272 is sufficiently long so that when it bears against the outer door panel 286 it also assists in preventing the upper edge of the framed panel portion from being pushed outwardly. Leg 292, in bearing against the outer surface of door panel 286, also assists in preventing the upper edge of the framed panel portion from being pushed outwardly. Engagement of hinge members 276 and 277 in sleeve members 278 and 279 also prevents edgewise movement of panel 47 in either direction.

To assemble panel 47 on the cab of truck 20, it is only necessary to align hinge members 276 and 277 with sleeve members 278 and 279 and to align leg 280 with the door channel 284. Panel 47 then may be dropped into place by inserting leg 280 into channel 284, by inserting hinge members 276 and 277 into sleeve members 278 and 279, and by disposing leg 292 on the exterior of the outer door panel 286 as shown. It thus will be appreciated that no fasteners of any kind are required for mounting panel 247 on cab door 274. It further will be appreciated that no modification to cab door 274 or any other part of truck 20 is required for mounting panel 47 in place. Panel 47 is simply and easily removed simply by lifting it until hinge members 276 and 277 clear sleeve members 278 and 279. Furthermore, it will be appreciated that when panel 47 is assembled in place, it does not interfere with the operation of window 290.

Panel 48 which is mounted on the left hand door of cab 22 is of the same construction as panel 47 and is mounted and disassembled in the same manner just described for panel 47.

As shown in FIG. 3, panel 50 comprises a rigid, rectangular frame 300 and a screen 302 of relatively stiff, strong expanded metal mesh which is welded to frame 300. An intermediae structural member 304 extends between the forward and rearward transversely extending portions of frame 300 about midway between the side portions of frame 300. Structural member 304 is welded at opposite ends to the transversely extending portions of frame 300. At the right and left hand rearward corners of panel 50 relatively short, downwardly extending pipe sections 306 and 307 are welded to frame 300 and receive existing, unshown roof support legs of cab 222. At the forward right and left corners of panel 50, two tabs indicated at 308 are welded to frame 300 and hook over the existing front windshield corner posts of the cab. Tabs 308 and the coaction of pipe sections 306 and 307 with the unshown roof support legs of the cab secure panel 50 in place. Panel 50 completely covers the roof of cab 22.

From the foregoing it will be appreciated that no modifications of any kind are required to truck 20 for mounting panels 30-50 in place. The complete assembly of panels 30-50 for truck 20 weighs approximately 650 pounds and can be packaged in a relatively small container that is 2½ feet high, 8 feet long, and 3 feet wide. It therefore can be readily and easily transported by aircraft or ground surface carriers to a desired location. Furthermore, no separate fasteners of any kind are required for assembling panels 30-50 in place. This simplifies the assembly and disassembly of panels 30-50. For truck 20, an untrained crew of three men can assemble panels 30-50 in about 5 minutes, and a trained crew of three men can do the same job in about 2 minutes.

The outer screens on panels 47-49, 32-35, 36-39, and 44-46, in addition to being resilient for repelling thrown objects, are also formed from the previously described material to provide a mirror effect which obscures a view of the interior of the cab and the rear bed structure enclosure from the outside of the truck. Furthermore, the screened construction of panels 30-50 provide for free circulation of air through the cab of the truck and also through the enclosure on the truck bed structure 24. The outer screens mentioned above, however, substantially preclude the passage of liquids, thus providing additional protection to the passengers.

It will be noted that seating engagement of the interlocked panels 40-43 on the inner frames of the adjacently disposed ones of panels 32-39 prevents panels 32-39 from individually being pushed or pulled upwardly. Also, the horizontal legs of flanges 132, 132c, 132d, 132e, 132f, and 132g overlap the upper rearward corners of frames 90, 90a, 90b, 90c, 90d, and 90e to provide a further interlock that prevents panels 32-34 and 36-38 from individually being pushed or pulled upwardly.

As shown in FIGS. 7 and 8, a pair of rigid, plate-like, spaced apart locking tabs 350 (FIG. 7) are fixed to the right hand side portion of frame 62b, and a similar pair of rigid, plate-like, spaced apart locking tabs 352 (FIG. 8) are fixed to the left hand side portion of frame 62b. Tabs 350 and 352 extend downwardly from frame 62b as shown. When panel 43 is assembled in place, tabs 350 removably extend downwardly between the upper horizontal portion (i.e., member 94) of frame 90 and screen 106, and tabs 352 similarly extend downwardly between the upper horizontal portion of frame 90a and the sub-assembly of frame 92a and screen 106a.

Tabs 350 are abuttable with opposed surfaces on frame 90 and the sub-assembly of frame 92 and screen 106, and tabs 350 similarly are abuttable with the opposed surfaces on frame 90a and the sub-assembly of frame 92a and screen 106a to prevent side panels 32 and 36 from being moved laterally away from panel 43. By preventing lateral movement of panels 32 and 36 with the interlocking tab construction just described, panel 43 cannot be freed by pushing or pulling panels 32 and 36 outwardly.

Still referring to FIGS. 7 and 8, a pair of spaced apart locking tabs 350c are fixed to the right hand side portion of frame 62c, and a further pair of spaced apart locking tabs 352c are fixed to the left hand side portion of frame 62c. Tabs 350c and 352c are of the same construction as tabs 350 and 352, are arranged in the same manner as tabs 350 and 352, and interlock with panels 33 and 37 in the same manner as described for the sub-assembly of panels 32, 36, and 43. Thus, tabs 350c extend between the upper horizontal portion of frame 90b and the sub-assembly of frame 92b and screen 106b, and tabs 352c extend between frame 90c and the sub-assembly of frame 92c and screen 106c to interlock panels 33, 37 and 42 in a manner that prevents panels 33 and 37 from being pushed or pulled laterally outwardly to thereby prevent panel 42 from being freed.

With continued reference to FIGS. 7 and 8, a pair of spaced apart locking tabs 350d are fixed to the right hand side portion of frame 62d, and a pair of spaced apart locking tabs 352d are fixed to the left hand side portion of frame 62d. Tabs 350d and 352d are of the same construction as tabs 350 and 352, are arranged in the same manner as tabs 350 and 352, and interlock with panels 34 and 38 in the same manner as described for the sub-assembly of panels 32, 36, and 43. Thus tabs 350d are received between the upper horizontal portion of frame 90d and the sub-assembly of frame 92d and screen 106d, and tabs 352d are received between the upper horizontal portion of frame 90e and the sub-assembly of frame 92e and screen 106e to prevent panels 34 and 38 from being pushed or pulled laterally outwardly and away from panel 41. Panel 41 therefore cannot be freed by laterally pushing or pulling panels 34 and 38.

Still referring to FIGS. 7 and 8, a pair of spaced apart locking tabs 350e are fixed to the right hand side portion of frame 62e, and a pair of spaced apart locking tabs 352e are fixed to the left hand side portion of frame 62e. Tabs 350e and 352e are of the same construction as tabs 350 and 352, are arranged in the same manner as tabs 350 and 352, and interlock with panels 35 and 39 in the same manner as described for the sub-assembly of panels 32, 36, and 43. Thus tabs 350e are received between the upper horizontal portion of frame 90f and the sub-assembly of frame 92f and screen 106f, and tabs 352e are received between the upper horizontal portion of frame 90g and the sub-assembly of frame 92g and screen 106g to prevent panels 35 and 39 from being pushed or pulled laterally outwardly and away from panel 40. Panel 40 therefore cannot be freed by laterally pushing or pulling panels 35 and 39.

It will be appreciated that the separable interlocks provided by tabs 350, 352, 350c, 352c, 350d, 352d, 350e, and 352e are accomplished without the use of fasteners of any kind.

When panel 43 is assembled in the previously described manner tabs 350 are slid into the space between frame 90 and the sub-assembly of frame 92 and screen 106, and tabs 352 are slid into the space between frame 90a and the sub-assembly of frame 92a and screen 106a. The other tabs on panels 42, 41, and 40 are positioned in the same manner upon assembly of their respective panels.

What is claimed and desired to be secured by Letters Patent is:

1. A conversion assembly for converting a truck having an open load or passenger-carrying bed structure into a carrier for either confining detained persons or protecting passengers wherein said truck has upwardly opening hollow stanchions extending upwardly from said bed structure, said conversion assembly comprising a series of enclosure-defining knockdown panels for enclosing said bed structure, a sub-assembly of said series of panels defining side and end wall portions of the enclosure defined by said series of panels, and said sub-assembly of panels being detachably mounted directly on said truck without the use of tool-manipulated fasteners of any kind, each of the panels forming said side wall portions comprising an inner frame, an outer frame fixed to said inner frame, a pair of legs rigid with said inner frame and being adapted to be removably slidably received in predetermined pair of said stanchions, and means fixed to said outer frame for enclosing the frame space bordered by said outer frame, said outer frame and said last mentioned means being disposed exteriorly of said pair of stanchions when said legs are received in said pair of stanchions, and said means enclosing said frame space comprising inner and outer screens fixed to said outer frame in spaced apart, essential parallel relation, with the outer one of said screens being sufficiently resilient to have a spring effect for repelling thrown objects.

2. The conversion assembly defined in claim 1 wherein said inner screen is formed from a relatively stiff, expanded metal mesh, and wherein said outer screen is formed from a material that obscures a view of the interior of the enclosure from a position outside the enclosure.

3. An assembly for converting a truck having an open load or passenger-carrying bed structure into a carrier for either confining detained persons or protecting passengers, said assembly comprising means adapted to be detachably mounted on said truck and defining an enclosure for enclosing said bed structure and having opposed spaced apart side walls, front and rear end walls, and a top wall covering the space confined by said side and end walls, door means forming a part of said enclosure-defining means and being supported for displacement between closed and opened positions to provide an opening for entering and leaving said enclosure, said door means defining at least a portion of said rear end wall, said enclosure-defining means restricting ingress and egress relative to said enclosure except through said opening, said enclosure defining means further including a series of separately formed knockdown panels that define said side walls, said top wall and said front end wall, and means interlocking said panels without the use of tool-manipulated fasteners of any kind and cooperating with said door means to prevent said panels from being displaced or removed from their enclosure-defining positions to positions allowing ingress or egress relative to said enclosure except upon predetermined displacement of said door means from its closed position.

4. An assembly for converting a truck having an open load or passenger-carrying bed structure into a carrier for either confining detained persons or protecting passengers, said assembly comprising a first sub-assembly having a series of separately formed knockdown panels detachably supported on said bed structure, a second sub-assembly having at least one panel-like door and cooperating with said first sub-assembly to define an enclosure having top, side and end walls for enclosing said bed structure, said second sub-assembly being displaceably supported by said first sub-assembly to provide an opening for entering and leaving said enclosure, and means interlocking said panels and cooperating with said second sub-assembly to prevent disassembly of said panels when said second sub-assembly is positioned to close said opening.

5. A conversion assembly for converting a truck having an open load or passenger-carrying bed structure into a carrier for confining detained persons or protecting passengers, said conversion assembly comprising an array of separately formed knockdown panels detachably supported on said bed structure and defining an enclosure for enclosing said bed structure to confine or protect persons occupying said bed structure, said enclosure being formed with opposed, spaced apart end walls, first and second opposed spaced apart side walls extending between said end walls, and a top wall covering the space confined by said end and side walls, said array having first, second, and third sub-assemblies of said panels, said first sub-assembly having at least one of said panels and defining one of said end walls, said second sub-assembly having at least two of said panels respectively defining a portion of said first side wall and a portion of said second side wall, said third sub-assembly having at least one panel defining a portion of said top wall, and means interlocking said first, second, and third sub-assemblies to enable the panels of said first, second, and third sub-assemblies to be assembled and disassembled only in a single predetermined order.

6. The conversion assembly defined in claim 5 wherein the order of disassembly of said sub-assemblies provided by said interlocking means is as follows: said third sub-assembly, said second sub-assembly, and first sub-assembly.

7. The conversion assembly defined in claim 6 wherein the panels of said first, second, and third sub-assemblies cooperate to define two corners of said enclosure.

8. The conversion assembly defined in claim 7 wherein said two panels defining said portions of said first and second side walls are disposed in spaced apart opposed relation, wherein said at least one panel defining said portion of said top wall spans the space between said two panels that define said portions of said first and second side walls, and wherein said at least one panel defining said one of said end walls is disposed adjacent to correspondingly facing edges to said two panels that define said portions of said first and second side walls and of said at least one panel that defines said portion of said top wall.

9. The conversion assembly defined in claim 8 wherein said interlocking means comprises a member fixed to said at least one panel defining said one of said end walls, said member having a leg portion overlapping the adjacent edge of said at least one top wall portion defining panel and being separably abuttable therewith to prevent said at least one top wall portion defining panel from being pushed or pulled upwardly and away from said at least one panel defining said one of said end walls at least in the region of said leg portion.

10. The conversion assembly defined in claim 8 wherein said two panels defining said two portions of said first and second side walls each have an exterior protective panel portion and a further portion disposed inwardly of and fixed to said exterior portion, said at least one panel defining said portion of said top wall being seated on said further portions of said two side wall portions defining panels between the exterior portions of said two side wall portion defining panels.

11. The conversion assembly defined in claim 8 wherein said interlocking means comprise tabs on opposite sides of said at least one top wall portion defining panel, said tabs being separably interlockingly received in spaces between said exterior and further portions of said two side wall portion defining panels to prevent the upper edge of each of said two side wall portion defining panels from being pushed or pulled away from said at least one top wall portion defining panel.

12. A conversion assembly for converting a truck having an open load or passenger-carrying bed structure into a carrier for confining detained persons or protecting passengers, said conversion assembly comprising an array of separately formed, knockdown panels detachably supported on said bed structure to define an enclosure of inverted box-like configuration for enclosing said bed structure, there being three of said panels respectively forming end wall, side wall, and top wall portions of said enclosure and being disposed adjacent to each other to define two corners of said enclosure, and means fixed on only one of said three panels for separably interlocking said three panels without the use of fasteners of any kind.

13. A conversion assembly for converting a truck having an open bed structure into a carrier for confining detained persons or protecting passengers, said conversion assembly comprising an array of separately formed knockdown panels detachably supported on said bed structure to define an enclosure for enclosing said bed structure to confine or protect persons occupying said bed structure, said enclosure having opposed spaced apart end walls, opposed spaced apart side walls extending between said end walls, and a top wall covering the space confined by said end and side walls, there being at least one of said panels defining each of said side walls and at least another one of said panels defining said top wall, the side wall-defining ones of said panels each having an exterior portion and an inner portion, said inner portion being formed with a top wall panel seating surface disposed at a level that is below the upper edge of said exterior portion, said top wall-defining panel being seated on the inner portion seating surfaces of said side wall-defining panels and being disposed between and confined against sideward movement by the regions of said exterior portions which extend above said seating surfaces.

14. An assembly for converting a truck having an open load or passenger-carrying bed structure into a carrier for either confining detained persons or protecting passengers, said assembly comprising means adapted to be mounted on said truck for detaining or protecting persons on said bed structure and defining an enclosure for enclosing said bed structure and having opposed spaced apart side walls, front and rear end walls, and a top wall covering the space confined by said side and end walls, door means forming a part of said enclosure-defining means and being supported for displacement between closed and opened positions to provide an opening in one of said end walls for entering and leaving said enclosure, said enclosure-defining means further including a series of separately formed knockdown panels that define said top wall, said side walls and the other of said end walls, and means interlocking said panels and cooperating with said door means (a) to prevent said panels from being displaced or removed from their assembled, enclosure-defining positions to positions allowing personnel ingress or egress relative to said enclosure when said door means is in its closed position and (b) to enable disassembly of said panels upon predetermined displacement of said door means from said closed position.

15. The assembly defined in claim 14 wherein each of said panels is disposed adjacent to at least another one of said panels, and wherein said interlocking means comprises coacting formations respectively on adjacently disposed ones of said panels and being in separable seating surface engagement with each other, said panels being retained against displacement from their assembled enclosure-defining positions only by the separable seating surface engagement of said formations.

16. An assembly for converting a truck having an open load or passenger-carrying bed structure into a carrier for either confining detained persons or protecting passengers, wherein said truck has upwardly opening hollow stanchions extending upwardly from said bed structure, said assembly comprising means adapted to be mounted on said truck and including panel means and door means, said door means cooperating with said panel means for defining an enclosure enclosing said bed structure and having opposed spaced apart end walls, opposed spaced apart side walls extending between said end walls, and a top wall covering the space confined by said side and end walls, said door means providing an opening in one of said end walls for entering and leaving said enclosure, said panel means comprising a plurality of knockdown panels forming portions of said side walls, and each of said knockdown panels comprising rigid structural means comprising a pair of legs that are adapted to be removably slidably received in a predetermined pair of said stanchions, a frame fixed to said structural means, and means fixed to said frame for enclosing the space bordered by said frame, said frame and said means fixed to said frame for enclosing said space being disposed exteriorly of said predetermined pair of stanchions in overlapping relation thereto when said legs are received in said pair of stanchions to block access to said pair of stanchions from the exterior of said enclosure.

17. An assembly for converting a truck having an open load or passenger-carrying bed structure into a carrier for either confining detained persons or protecting passengers, said assembly comprising means adapted to be detachably mounted on said truck and forming an enclosure for enclosing said bed structure and having opposed spaced apart side walls, front and rear wall end walls and a top wall covering the space confined by said side and end walls, door means forming a part of said enclosure-defining means to provide an opening at said rear end wall for entering and leaving said enclosure, said enclosure-defining means further including a series of knockdown panels defining said side walls, said top wall and said front end wall, said panels blocking ingress and egress relative to said enclosure except through said opening, and means detachably interlocking said panels to prevent each panel from being removed transversely of the enclosure-forming wall portion that it defines, said interlocking means having portions that are accessible from the exterior of said enclosure, and all of the portions of said interlocking means that are accessible from the exterior of said enclosure being permanently fixed to predetermined ones of said panels.

18. An assembly for converting a truck having an open load or passenger-carrying bed structure into a carrier for either confining detained persons or protecting passengers, said assembly comprising means adapted to be detachably mounted on said truck and forming an enclosure for enclosing said bed structure and having opposed spaced apart side walls, front and rear wall end walls and a top wall covering the space confined by said side and end walls, door means forming a part of said enclosure-defining means to provide a security opening at said rear end wall for entering and leaving said enclosure, said enclosure-defining means further including a series of knockdown panels defining said side walls, said top wall and said front end wall, said panels blocking ingress and egress relative to said enclosure except through said opening, and means detachably interlocking said panels to prevent each panel from being removed transversely of the enclosure-forming wall portion that it defines, said interlocking means having portions that are accessible from the interior of said enclosure, and all of the portions of said interlocking means that are accessible from the interior of said enclosure being permanently fixed to predetermined ones of said panels.

19. An assembly for converting a truck having an open load or passenger-carrying bed structure into a carrier for either confining detained persons or protecting passengers, wherein said truck has upwardly opening hollow stanchions extending upwardly from said bed structure, said assembly comprising means adapted to be mounted on said truck and including panel means and door means, said door means cooperating with said panel means for defining a security enclosure enclosing said bed structure and having opposed spaced apart end walls, opposed spaced apart side walls, and a top wall covering the space confined by said side and end walls, said door means providing an opening in one of said end walls for entering and leaving said enclosure, said panel means cooperating with said door means to block ingress into and egress from said enclosure when said door means is held closed, said panel means comprising a first plurality of knockdown panels forming portions of said side walls, and each of said knockdown panels comprising rigid structural means having a pair of legs that are adapted to be removably slidably received in a predetermined pair of said stanchions, a frame fixed to said structural means and means fixed to said frame for blocking the space bordered by said frame to block ingress and egress through said space, said frame and said means fixed to said frame for blocking said space being disposed exteriorly of said predetermined pair of stanchions in overlapping relation thereto when said legs are received in said pair of stanchions to block access to said pair of stanchions from the exterior of said enclosure, said panel means including a second plurality of knockdown panels defining said top wall and the other of said end walls.

20. The assembly defined in claim 19, wherein said means for blocking the space bordered by said frame comprises a screen.

21. An assembly for converting a truck having an open load or passenger-carrying bed structure into a carrier for either confining detained persons or protecting passengers, said assembly comprising means adapted to be mounted on said truck and including an array of separately formed, knockdown panels and door means, said door means cooperating with said panels for defining a security enclosure enclosing said bed structure and having opposed spaced apart end walls, opposed spaced apart side walls, and a top wall covering the space confined by said side and end walls, said door means providing an opening in one of said end walls for entering and leaving said enclosure, said panels cooperating with said door means to block ingress into and egress from said enclosure when said door means is held closed, there being at least one of said panels defining each of said side walls and at least another one of said panels defining said top wall, the side wall-defining ones of said panels each having (a) a frame, (b) means fixed to said frame for blocking the space bordered by said frame, and (c) structural means fixed to said frame, said structural means being disposed on the inner side of said frame and defining an upwardly facing top wall panel seating surface, said seating surface being disposed inwardly of said frame and at a level below the upper edge of said frame, said top wall-defining panel being seated on the seating surfaces defined by said structural means and being disposed between the regions of the frames of said side wall-defining panels which extend above said seating surfaces, said regions of said frames extending above said seating surfaces being disposed to confine sideward movement of said top wall-defining panel.

22. The assembly defined in claim 21 wherein said truck has upwardly opening stanchions extending upwardly from said bed structure, and wherein each of said side wall-defining panels includes a pair of leg portions, said leg portions being rigid with said structural means and arranged to be removably slidably received in a pair of said stanchions upon assembly of said side wall-defining panel on said bed structure.

23. In combination with a truck having an open load or passenger-carrying bed structure and upwardly opening hollow stanchions extending upwardly from said bed structure, an assembly detachably mounted on said truck and including panel means and door means, said door means cooperating with said panel means for defining a security enclosure enclosing said bed structure and having opposed spaced apart end walls, opposed spaced side walls extending between said end walls, and a top wall covering the space confined by said side and end walls, said door means providing an opening in one of said end walls for entering and leaving said enclosure, said panel means cooperating with said door means to block ingress into and egress from said enclosure when said door means is held closed, said panel means comprising a plurality of knockdown panels forming portions of said side walls, and each of said knockdown panels comprising a frame, a pair of legs fixed to said frame and removably slidably received in a pre-selected pair of said stanchions, and means fixed to said frame for blocking the space bordered by said frame, said frame and said blocking means being disposed exteriorly of said pre-selected pair of stanchions in overlapping relation thereto when said legs are received in said pair of stanchions to block access to said pre-selected pair of stanchions from the exterior of said enclosure.

24. The combination defined in claim 23 wherein said blocking means comprises a screen.

25. The combination defined in claim 23 wherein said panel means includes a further plurality of knockdown panels that define said top wall and the other of said end walls.

26. The combination defined in claim 25, wherein two knockdown panels of said futher plurality of panels defines said other of said end walls, one of said two panels being mounted on and supported by the other of said two panels.

27. The combination defined in claim 25 wherein said assembly further comprises means for detachably interlocking the side-wall-forming knockdown panels and said further plurality of said panels.

28. In combination with a truck having an open load or passenger-carrying bed structure, an assembly detachably mounted on said truck for either confining detained persons or protecting passengers on said bed structure said assembly comprising an array of separately formed, knockdown panels and door means, said door means cooperating with said panels for defining a security enclosure enclosing said bed structure and having opposed spaced apart end walls, opposed spaced apart side walls, and a top wall covering the space confined by said side and end walls, said door means providing an opening in one of said end walls for entering and leaving said enclosure, said panels cooperating with said door means to block ingress into and egress from said enclosure when said door means is held closed, there being at least one of said panels defining each of said side walls and at least another one of said panels defining said top wall, the side wall-defining ones of said panels each having (a) a frame, (b) means fixed to same frame for blocking the space bordered by said frame, and (c) structural means fixed to said frame, said structural means being disposed on the inner side of said frame and defining an upwardly facing top wall panel seating surface, said seating surface being disposed inwardly of said frame and at a level below the upper edge of said frame, said top wall-defining panel being seated on the seating surfaces defined by said structural means and being disposed between the regions of the frames of said side wall-defining panels which extend above said seating surfaces, said regions of said frames extending above said seating surfaces being disposed to confine sideward movement of said top wall-defining panel.

* * * * *